US005695679A

United States Patent [19]

Christie et al.

[11] Patent Number: 5,695,679

[45] Date of Patent: Dec. 9, 1997

[54] DETERGENT COMPOSITIONS CONTAINING AN ORGANIC SILVER COATING AGENT TO MINIMIZE SILVER TRAINING IN ADW WASHING METHODS

[75] Inventors: Julie Ann Christie; Fiona Susan MacBeath, both of Newcastle upon Tyne, England

[73] Assignee: The Procter & Gamble Company, Cincinnati, Ohio

[21] Appl. No.: 496,836

[22] Filed: Jun. 29, 1995

[30] Foreign Application Priority Data

Jul. 7, 1994 [GB] United Kingdom .................... 9413729

[51] Int. Cl.$^{6}$ .......................... C01B 15/04; C01B 15/055; C11D 3/39; B08B 9/20

[52] U.S. Cl. ................................ 252/186.26; 252/186.27; 252/186.3; 252/186.33; 252/186.38; 510/220; 510/221; 510/245; 510/255; 510/267; 510/270; 510/271; 134/25.2

[58] Field of Search ............................ 252/186.1, 186.26, 252/186.27, 186.28, 186.29, 186.3, 186.31, 186.33, 186.38, 186.39, 186.41, 186.42, 186.43; 510/220, 221, 227, 223, 245, 254, 255, 267, 270, 271; 134/25.2

[56] References Cited

U.S. PATENT DOCUMENTS

| | | | |
|---|---|---|---|
| 3,936,537 | 2/1976 | Baskerville, Jr. et al. | 510/330 |
| 4,136,052 | 1/1979 | Mazzola | 510/302 |
| 4,192,761 | 3/1980 | Peltre et al. | 510/317 |
| 4,391,723 | 7/1983 | Bacon et al. | 252/186.25 |
| 4,526,698 | 7/1985 | Kuroda et al. | 510/305 |
| 4,853,000 | 8/1989 | Potter | 51/309 |
| 4,892,673 | 1/1990 | Dixit et al. | 510/338 |
| 5,200,236 | 4/1993 | Lang et al. | 427/213 |
| 5,246,621 | 9/1993 | Favre et al. | 252/186.33 |
| 5,312,557 | 5/1994 | Onda et al. | 510/309 |
| 5,340,496 | 8/1994 | Sato et al. | 252/186.27 |
| 5,372,740 | 12/1994 | Fair et al. | 510/221 |
| 5,374,369 | 12/1994 | Angevaare et al. | 510/220 |
| 5,411,673 | 5/1995 | Agar et al. | 252/186.25 |
| 5,453,216 | 9/1995 | Kellett | 252/186.25 |
| 5,505,740 | 4/1996 | Kong et al. | 8/111 |

*Primary Examiner*—Joseph D. Anthony

*Attorney, Agent, or Firm*—Michael D. Jones; Brian M. Bolam; Kim W. Zerby

[57] ABSTRACT

There is provided a bleaching composition containing (a) an oxygen-releasing bleaching agent as a source of available oxygen and (b) a non-paraffin oil organic silver coating agent. In one aspect the rate of release of available oxygen is carefully controlled such that the available oxygen is completely released from the composition in a time interval of from 3.5 minutes to 10.0 minutes. In another aspect the composition contains (c) an additional corrosion inhibitor compound.

25 Claims, No Drawings

DETERGENT COMPOSITIONS CONTAINING AN ORGANIC SILVER COATING AGENT TO MINIMIZE SILVER TRAINING IN ADW WASHING METHODS

FIELD OF THE INVENTION

This invention relates to oxygen bleaching compositions for use in the washing of tableware including silverware. The compositions contain an agent capable, in use, of forming a protective coating on the silverware, thereby inhibiting any silver tarnishing effects of the oxygen bleach.

The present invention is concerned with the silver-tarnishing problem encountered when bleaching compositions which contain oxygen bleaches are employed in machine dishwashing methods.

BACKGROUND OF THE INVENTION

The satisfactory removal of bleachable soils such as tea, fruit juice and coloured vegetable soils, such as carotenoid soils is a particular challenge to the formulator of a machine dishwashing composition. Traditionally, the removal of such soils has been enabled by the use of bleach components such as oxygen and chlorine bleaches.

A problem encountered with the use of such bleaches is the tarnishing of any silverware components of the washload. Oxygen bleaches tend to give rise to the problem of tarnishing more than chlorine bleaches. The level of tarnishing observed can range from slight discolouration of the silverware to the formation of a dense black coating on the surface of the silverware.

The formulator thus faces the dual challenge of formulating a product which maximises bleachable soil cleaning but minimises the occurrence of tarnishing of silverware components of the washload.

SUMMARY OF THE INVENTION

The Applicants have found that the problem of tarnishing can be more severe when an oxygen bleaching species is employed, than when a chlorine bleach is employed. The problem also exists when certain transition metal ion containing bleach catalysts in combination with the oxygen bleaching species.

It has been found that enhanced anti-silver tarnishing as well as good cleaning performance can be achieved through the combined use of a non paraffin oil silver coating agent, and preferably careful control of oxygen-bleaching power and control of the ram of release of the oxygen bleach.

The rate of release of oxygen bleach should be rapid enough to provide satisfactory cleaning, but not so rapid that tarnishing is enabled. It is the Applicant's belief that a sufficient time interval, prior to release of the oxygen bleach, is preferable to allow for an effective coating on the silverware to form. This coating protects the silver surface from the potential tarnishing effect of the oxygen bleach species.

The Applicants have also found that further enhanced anti-tarnishing properties can be achieved by the inclusion of certain corrosion inhibitor components, especially benzotriazole and derivatives thereof or certain heavy metal ion sequestrants.

The use of paraffin oil as a coating agent component of a silver tarnish inhibiting system for use in a machine dishwashing method has been described in the Applicant's copending PCT Applications Ser. Nos. US-94/00355 and US-94/00570 and European Application No. 93201918.5.

It is an object of the present invention to provide compositions suitable for use in machine dishwashing methods having enhanced anti-silver tarnishing properties, as well as good cleaning performance, particularly bleachable soil removal performance.

BRIEF DESCRIPTION OF THE INVENTION

According to the present invention there is provided a bleaching composition containing (a) an oxygen-releasing bleaching agent as a source of available oxygen; and (b) a non-paraffin oil organic silver coating agent wherein the rate of release of available oxygen is such that, when using the method described in the present description, the available oxygen is completely released from the composition in a time interval of from 3.5 minutes to 10.0 minutes.

Preferably, the level of available oxygen in the present compositions, measured in units of % available oxygen by weight of the composition, is from 0.3% to 1.7% measured according to the method described herein.

According to another aspect of the invention there is provided a bleaching composition containing (a) an oxygen-releasing bleaching agent as a source of available oxygen;

(b) a non-paraffin oil organic silver coating agent; and (c) an additional corrosion inhibitor compound.

Preferred additional corrosion inhibitor compounds include benzotriazole, and any derivatives thereof, and heavy metal sequestrants, particularly aminophosphonate heavy metal ion sequestrants.

Preferably, when additional corrosion inhibitor compound is present, the rate of release of available oxygen and total level of available oxygen are chosen using the same limits as for when the additional corrosion inhibitor is not present.

DETAILED DESCRIPTION

Oxygen-releasing bleaching agent

The compositions of the invention contain as an essential component an oxygen-releasing bleaching agent. The bleaching agent may be hydrogen peroxide or a source thereof, an organic peroxyacid or a source thereof, including, for example, a peroxyacid bleach precursor compound. Preferably the oxygen-releasing bleaching agent comprises in combination an inorganic perhydrate salt, as a hydrogen peroxide source, and a peroxyacid bleach precursor compound.

Where the organic peroxyacid source is a peroxyacid bleach precursor compound, the production of the peroxyacid occurs by an in situ reaction of the precursor with a source of hydrogen peroxide. Suitable sources of hydrogen peroxide include inorganic perhydrate bleaches.

Inorganic perhydrate bleaches

The compositions in accord with the invention preferably include, as a hydrogen peroxide oxygen bleach source, an inorganic perhydrate salt, most especially when the organic peroxyacid source is a peroxyacid bleach precursor compound.

The inorganic perhydrate salts are normally incorporated in the form of the sodium salt at a level of from 1% to 40% by weight, more preferably from 2% to 30% by weight and most preferably from 5% to 25% by weight of the compositions.

Examples of inorganic perhydrate salts include perborate, percarbonate, perphosphate, persulfate and persilicate salts.

The inorganic perhydrate salts are normally the alkali metal salts. The inorganic perhydrate salt may be included as the crystalline solid without additional protection. For certain perhydrate salts however, the preferred executions of such granular compositions utilize a coated form of the material which provides better storage stability for the perhydrate salt in the granular product.

Sodium perborate can be in the form of the monohydrate of nominal formula $NaBO_2H_2O_2$ or the tetrahydrate $NaBO_2H_2O_2.3H_2O$.

Sodium percarbonate, which is a preferred perhydrate for inclusion in detergent compositions in accordance with the invention, is an addition compound having a formula corresponding to $2Na_2CO_3.3H_2O_2$, and is available commercially as a crystalline solid. The percarbonate is most preferably incorporated into such compositions in a coated form which provides in product stability.

A suitable coating material providing in product stability comprises mixed salt of a water soluble alkali metal sulphate and carbonate. Such coatings together with coating processes have previously been described in GB-1,466,799, granted to Interox on 9th Mar. 1977. The weight ratio of the mixed salt coating material to percarbonate lies in the range from 1:200 to 1:4, more preferably from 1:99 to 1:9, and most preferably from 1:49 to 1:19. Preferably, the mixed salt is of sodium sulphate and sodium carbonate which has the general formula $Na_2SO_4.n.Na_2CO_3$ wherein n is form 0.1 to 3, preferably n is from 0.3 to 1.0 and most preferably n is from 0.2 to 0.5.

Potassium peroxymonopersulfate is another inorganic perhydrate salt of use in the detergent compositions herein.

Peroxyacid bleach precursors

Peroxyacid bleach precursors (bleach activators) are preferred peroxyacid sources herein. Peroxyacid bleach precursors are normally incorporated at a level of from 0.5% to 20% by weight, more preferably from 1% to 15% by weight, most preferably from 1.5% to 10% by weight of the compositions.

Suitable peroxyacid bleach precursors typically contain one or more N- or O- acyl groups, which precursors can be selected from a wide range of classes. Suitable classes include anhydrides, esters, imides and acylated derivatives of imidazoles and oximes, and examples of useful materials within these classes are disclosed in GB-A-1586789.

Suitable esters are disclosed in GB-A-836988, 864798, 1147871, 2143231 and EP-A-0170386. The acylation products of sorbitol, glucose and all saccharides with benzoylating agents and acetylating agents are also suitable.

Specific O-acylated precursor compounds include 2,3,3-tri-methyl hexanoyl oxybenzene sulfonates, benzoyl oxybenzene sulfonates, nonanoyl-6-amino caproyl oxybenzene sulfonates, monobenzoyltetraacetyl glucose, benzoyl peroxide and cationic derivatives of any of the above, including the alkyl ammonium derivatives and pentaacetyl glucose. Phthalic anhydride is a suitable anhydride type precursor.

Specific cationic derivatives of the O-acyl precursor compounds include 2-(N,N,N-trimethyl ammonium) ethyl sodium 4-sulphophenyl carbonate chloride, and any of the alkyl ammonium derivatives of the benzoyl oxybenzene sulfonates including the 4-(trimethyl ammonium) methyl derivative.

Useful N-acyl compounds are disclosed in GB-A-855735, 907356 and GB-A-1246338.

Preferred precursor compounds of the imide type include N-benzoyl succinimide, tetrabenzoyl ethylene diamine, N-benzoyl substituted ureas and the N-,N,$N^1N^1$ tetra acetylated alkylene diamines wherein the alkylene group contains from 1 to 6 carbon atoms, particularly those compounds in which the alkylene group contains 1, 2 and 6 carbon atoms. Tetraacetyl ethylene diamine (TAED) is particularly preferred.

N-acylated precursor compounds of the lactam class are disclosed generally in GB-A-955735. Whilst the broadest aspect of the invention contemplates the use of any lactam useful as a peroxyacid precursor, preferred materials comprise the caprolactams and valerolactams.

Suitable N-acylated lactam precursors have the formula:

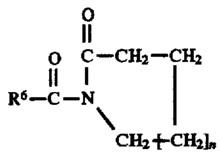

wherein n is from 0 to about 8, preferably from 0 to about 2, and $R^6$ is H, an alkyl, aryl, alkoxyaryl or alkaryl group containing from 1 to 12 carbons, or a substituted phenyl group containing from 6 to 18 carbon atoms Suitable caprolactam bleach precursors are of the formula:

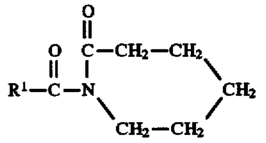

wherein $R^1$ is H or an alkyl, aryl, alkoxyaryl or alkaryl group containing from 1 to 12 carbon atoms, preferably from 6 to 12 carbon atoms, most preferably $R^1$ is phenyl.

Suitable valero lactams have the formula:

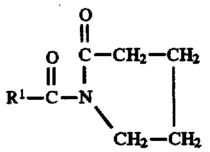

wherein $R^1$ is H or an alkyl, aryl, alkoxyaryl or alkaryl group containing from 1 to 12 carbon atoms, preferably from 6 to 12 carbon atoms. In highly preferred embodiments, $R^1$ is selected from phenyl, heptyl, octyl, nonyl, 2,4,4-trimethylpentyl, decenyl and mixtures thereof.

The most preferred materials are those which are normally solid at <30° C., particularly the phenyl derivatives, ie. benzoyl valerolactam, benzoyl caprolactam and their substituted benzoyl analogues such as chloro, amino alkyl, alkyl, aryl and alkoxy derivatives.

Caprolactam and valerolactam precursor materials wherein the $R^1$ moiety contains at least 6, preferably from 6 to about 12, carbon atoms provide peroxyacids on perhydrolysis of a hydrophobic character which afford nucleophilic and body soil clean-up. Precursor compounds wherein $R^1$ comprises from 1 to 6 carbon atoms provide hydrophilic bleaching species which are particularly efficient for bleaching beverage stains. Mixtures of 'hydrophobic' and 'hydrophilic' caprolactams and valero lactams, typically at weight ratios of 1:5 to 5:1, preferably 1:1, can be used herein for mixed stain removal benefits.

Highly preferred caprolactam and valerolactam precursors include benzoyl caprolactam, nonanoyl capro-lactam, benzoyl valerolactam, nonanoyl valerolactam, 3,5,5-trimethylhexanoyl caprolactam, 3,5,5-trimethylhexanoyl valerolactam, octanoyl caprolactam, octanoyl valerolactam, decanoyl caprolactam, decanoyl valerolactam, undecenoyl caprolactam, undecenoyl valerolactam, (6-octanamidocaproyl)oxybenzene-sulfonate, (6-nonanamidocaproyl)oxybenzenesulfonate, (6-decanamidocaproyl)oxybenzenesulfonate, and mixtures thereof. Examples of highly preferred substituted benzoyl lactams include methylbenzoyl caprolactam, methylbenzoyl valerolactam, ethylbenzoyl caprolactam, ethylbenzoyl valerolactam, propylbenzoyl caprolactam, propylbenzoyl valerolactam, isopropylbenzoyl caprolactam, isopropylbenzoyl valerolactam, butylbenzoyl caprolactam, butylbenzoyl valerolactam, tert-butylbenzoyl caprolactam, tert-butylbenzoyl valerolactam, pentylbenzoyl caprolactam, pentylbenzoyl valerolactam, hexylbenzoyl caprolactam, hexylbenzoyl valerolactam, ethoxybenzoyl caprolactam, ethoxybenzoyl valerolactam, propoxybenzoyl caprolactam, propoxybenzoyl valerolactam, isopropoxybenzoyl caprolactam, isopropoxybenzoyl valerolactam, butoxybenzoyl caprolactam, butoxybenzoyl valerolactam, tert-butoxybenzoyl caprolactam, tert-butoxybenzoyl valerolactam, pentoxybenzoyl caprolactam, pentoxybenzoyl valerolactam, hexoxybenzoyl caprolactam, hexoxybenzoyl valerolactam, 2,4,6-trichlorobenzoyl caprolactam, 2,4,6-trichlorobenzoyl valerolactam, pentafluorobenzoyl caprolactam, pentafluorobenzoyl valerolactam, dichlorobenzoyl caprolactam, dimethoxybenzoyl caprolactam, 4-chlorobenzoyl caprolactam, 2,4-dichlororbenzoyl caprolactam, terephthaloyl dicaprolactam, pentafluorobenzoyl caprolactam, pentafluorobenzoyl valerolactam, dichlorobenzoyl valerolactam, dimethoxybenzoyl valerolactam, 4-chlorobenzoyl valerolactam, 2,4-dichlororbenzoyl valerolactam, terephthaloyl divalerolactam, 4-nitrobenzoyl caprolactam, 4-nitrobenzoyl valerolactam, and mixtures thereof.

Suitable imidazoles include N-benzoyl imidazole and N-benzoyl benzimidazole and other useful N-acyl group-containing peroxyacid precursors include N-benzoyl pyrrolidone, dibenzoyl murine and benzoyl pyroglutamic acid.

Another preferred class of peroxyacid bleach activator compounds are the amide substituted compounds of the following general formulae:

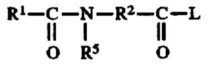

or

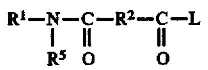

wherein $R^1$ is an aryl or alkaryl group with from about 1 to about 14 carbon atoms, $R^2$ is an alkylene, arylene, and alkarylene group containing from about 1 to 14 carbon atoms, and $R^5$ is H or an alkyl, aryl, or alkaryl group containing 1 to 10 carbon atoms and L can be essentially any leaving group. $R^1$ preferably contains from about 6 to 12 carbon atoms. $R^2$ preferably contains from about 4 to 8 carbon atoms. $R^1$ may be straight chain or branched alkyl, substituted aryl or alkylaryl containing branching, substitution, or both and may be sourced from either synthetic sources or natural sources including for example, tallow fat. Analogous structural variations are permissible for $R^2$. The substitution can include alkyl, aryl, halogen, nitrogen, sulphur and other typical substituent groups or organic compounds. $R^5$ is preferably H or methyl. $R^1$ and $R^5$ should not contain more than 18 carbon atoms in total. Amide substituted bleach activator compounds of this type are described in EP-A-0170386.

The L group must be sufficiently reactive for the reaction to occur within the optimum time frame (e.g., a wash cycle). However, if L is too reactive, this activator will be difficult to stabilize for use in a bleaching composition. These characteristics are generally paralleled by the pKa of the conjugate acid of the leaving group, although exceptions to this convention are known. Ordinarily, leaving groups that exhibit such behavior are those in which their conjugate acid has a pKa in the range of from about 4 to about 13, preferably from about 6 to about 11 and most preferably from about 8 to about 11.

Preferred bleach precursors are those wherein $R^1$, $R^2$ and $R^5$ are as defined for the amide substituted compounds and L is selected from the group consisting of:

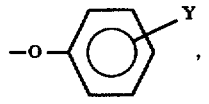

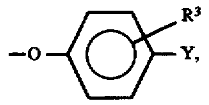

and

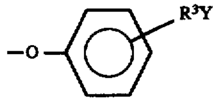

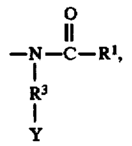

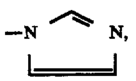

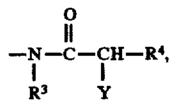

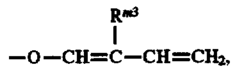

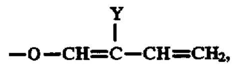

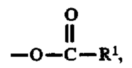

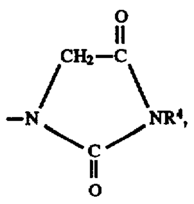

-continued

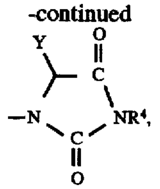

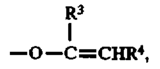

and

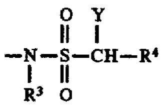

and mixtures thereof, wherein $R^1$ is an alkyl, aryl, or alkaryl group containing from about 1 to about 14 carbon atoms, $R^3$ is an alkyl chain containing from 1 to about 8 carbon atoms, $R^4$ is H or $R^3$, and Y is H or a solubilizing group.

The preferred solubilizing groups are $—SO_3^-M^+$, $—CO_2^-M^+$, $—SO_4^-M^+$, $-N^+(R^3)_4X^-$ and $O{<}—N(R^3)_3$ and most preferably $—SO_3^-M^+$ and $—CO_2^-M^+$ wherein $R^3$ is an alkyl chain containing from about 1 to about 4 carbon atoms, M is a cation which provides solubility to the bleach activator and X is an anion which provides solubility to the bleach activator. Preferably, M is an alkali metal, ammonium or substituted ammonium cation, with sodium and potassium being most preferred, and X is a halide, hydroxide, methylsulfate or acetate anion. It should be noted that bleach activators with a leaving group that does not contain a solubilizing groups should be well dispersed in the bleaching solution in order to assist in their dissolution.

Preferred examples of bleach activators of the above formulae include (6-octanamidocaproyl) oxybenzenesulfonate, (6-nonanamidocaproyl) oxybenzenesulfonate, (6-decanamidocaproyl) oxybenzenesulfonate, and mixtures thereof.

Other preferred precursor compounds include those of the benzoxazin-type, having the formula:

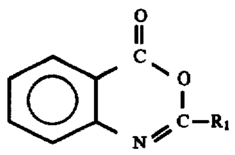

including the substituted benzoxazins of the type

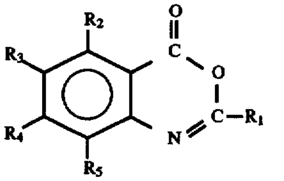

wherein $R_1$ is H, alkyl, alkaryl, aryl, arylalkyl, and wherein $R_2$, $R_3$, $R_4$, and $R_5$ may be the same or different substituents selected from H, halogen, alkyl, alkenyl, aryl, hydroxyl, alkoxyl, amino, alkyl amino, $COOR_6$ (wherein $R_6$ is H or an alkyl group) and carbonyl functions.

An especially preferred precursor of the benzoxazin-type is:

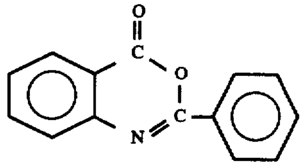

Organic peroxyacids

The compositions may contain, as the oxygen bleach, organic peroxyacids typically at a level of from 0.5% to 15% by weight, more preferably from 1% to 10% by weight of the composition.

A preferred class of organic peroxyacid compounds are the amide substituted compounds of the following general formulae:

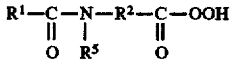

or

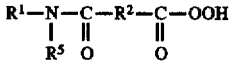

wherein $R^1$ is an aryl or alkaryl group with from about 1 to about 14 carbon atoms, $R^2$ is an alkylene, arylene, and alkarylene group containing from about 1 to 14 carbon atoms, and $R^5$ is H or an alkyl, aryl, or alkaryl group containing 1 to 10 carbon atoms. $R^1$ preferably contains from about 6 to 12 carbon atoms. $R^2$ preferably contains from about 4 to 8 carbon atoms. $R^1$ may be straight chain or branched alkyl, substituted aryl or alkylaryl containing branching, substitution, or both and may be sourced from either synthetic sources or natural sources including for example, tallow fat. Analogous structural variations are permissible for $R^2$. The substitution can include alkyl, aryl, halogen, nitrogen, sulphur and other typical substituent groups or organic compounds. $R^5$ is preferably H or methyl. $R^1$ and $R^5$ should not contain more than 18 carbon atoms in total. Amide substituted organic peroxyacid compounds of this type are described in EP-A-0170386.

Other organic peroxyacids include diperoxy dodecanedioc acid, diperoxy tetra decanedioc acid, diperoxyhexadecanedioe acid, mono- and diperazelaic acid, mono- and diperbrassylic acid, monoperoxy phthalic acid, perbenzoic acid, and their salts as disclosed in, for example, EP-A-0341 947.

Total Available Oxygen (AvO) Level

Preferably, the level of available oxygen in the present compositions, measured in units of % available oxygen by weight of the composition, should be carefully controlled; the level of available oxygen should thus preferably be in the range 0.3% to 1.7%, preferably 0.5% to 1.5%, more preferably 0.6% to 1.2%, measured according to the method described hereunder.

Controlled rate of release of bleach

The rate of release of available oxygen may also be controlled such that, when using the method described hereinafter, the available oxygen is not completely released from the composition until after 3.5 minutes, preferably the available oxygen is released in a time interval of from 3.5 minutes to 10.0 minutes, more preferably from 4.0 minutes to 9.0 minutes, most preferably from 5.0 minutes to 8.5 minutes. Such controlled rate of release of available oxygen is essential in the absence of any additional corrosion inhibitor compound, and preferable in the presence of an additional corrosion inhibitor compound.

Controlled rate of release—means

Means may be provided for controlling the release of any hydrogen peroxide or peroxyacid bleach source per se to the wash solution. Such means could, for example, include delaying the release of any inorganic perhydrate salt, acting as a hydrogen peroxide source, to the wash solution.

The controlled release means can include coating any suitable component with a coating designed to provide the controlled release. The coating may therefore, for example, comprise a poorly water soluble material, or be a coating of sufficient thickness that the kinetics of dissolution of the thick coating provide the controlled rate of release.

The coating material may be applied using various methods. Any coating material is typically present at a weight ratio of coating material to bleach of from 1:99 to 1:2, preferably from 1:49 to 1:9.

In a preferred execution, the coating material comprises any of the organic silver coating agents which are useful in accord with the invention.

Other suitable coating materials can comprise the alkali and alkaline earth metal sulphates, silicates and carbonates, including calcium carbonate.

A preferred coating material particularly for an inorganic perhydrate salt bleach source is sodium silicate of $SiO_2$:$Na_2O$ ratio from 1.6:1 to 3.4:1, preferably 2.8:1, applied as an aqueous solution to give a level of from 2% to 10%, (normally from 3% to 5%) of silicate solids by weight of the inorganic perhydrate salt. Magnesium silicate can also be included in the coating.

Any inorganic salt coating materials may be combined with organic binder materials to provide composite inorganic salt/organic binder coatings. Suitable binders include the $C_{10}$–$C_{20}$ alcohol ethoxylates containing from 5–100 moles of ethylene oxide per mole of alcohol and more preferably the $C_{15}$–$C_{20}$ primary alcohol ethoxylates containing from 20–100 moles of ethylene oxide per mole of alcohol.

Copolymers of maleic anhydride with ethylene, methylvinyl ether or methacrylic acid, the maleic anhydride constituting at least 20 mole percent of the polymer are further examples of polymeric materials useful as binder agents. These polymeric materials may be used as such or in combination with solvents such as water, propylene glycol and the above mentioned $C_{10}$–$C_{20}$ alcohol ethoxylates containing from 5–100 moles of ethylene oxide per mole. Further examples of binders include the $C_{10}$–$C_{20}$ mono- and diglycerol ethers and also the $C_{10}$–$C_{20}$ fatty acids.

In a preferred execution the binders comprise any of the organic silver coating agents which are useful in accord with the invention.

One method for applying the coating material involves agglomeration. Preferred agglomeration processes include the use of any of the organic binder materials described hereinabove. Any conventional agglomerator/mixer may be used including, but not limited to pan, rotary drum and vertical blender types. Molten coating compositions may also be applied either by being poured onto, or spray atomized onto a moving bed of bleaching agent.

Other means of providing the required controlled release include mechanical means for altering the physical characteristics of the bleach to control its solubility and rate of release. Suitable protocols could include compaction, mechanical injection, manual injection, and adjustment of the solubility of the bleach compound by selection of particle size of any particulate component.

Whilst the choice of particle size will depend both on the composition of the particulate component, and the desire to meet the desired controlled release kinetics, it is desirable that the particle size should be more than 500 micrometers, preferably having an average particle diameter of from 800 to 1200 micrometers.

Additional protocols for providing the means of controlled release include the suitable choice of any other components of the detergent composition matrix such that when the composition is introduced to the wash solution the ionic strength environment therein provided enables the required controlled release kinetics to be achieved.

Controlled rate of release—test method

The rate of release of available oxygen can be measured according to the method now described:

1. A beaker of water (typically 2 liter) is placed on a stirrer Hotplate, and the stirrer speed is selected to ensure that the product is evenly dispersed through the solution.
2. The detergent composition (typically 8 g of product which has been sampled down from a bulk supply using a Pascal sampler), is added and simultaneously a stop clock is started.
3. The temperature control should be adjusted so as to maintain a constant temperature of 20° C. throughout the experiment.
4. Samples are taken from the detergent solution at 2 minute time intervals for 20 mins, starting after 1 minute, and are titrated by the "titration procedure" described below to determine the level of available oxygen at each point.

Titration Procedure

1. An aliquot from the detergent solution (above) and 2 ml sulphuric acid are added into a stirred beaker
2. Approximately 0.2 g ammonium molybdate catalyst (tetra hydrate form) are added
3. 3 mls of 10% sodium iodide solution are added
4. Titration with sodium thiosulphate is conducted until the end point. The end point can be seen using either of two procedures. First procedure consists simply in seeing the yellow iodine colour fading to clear. The second and preferred procedure consists of adding soluble starch when the yellow colour is becoming faint, turning the solution blue. More thiosulphate is added until the end point is reached (blue starch complex is decolourised).

The level of AvO, measured in units of % available oxygen by weight, for the sample at each time interval corresponds to the amount of titre according to the following equation $$\frac{\text{Vol } S_2O_3 \text{ (ml)} \times \text{Molarity}(S_2O_3) \times 8}{\text{Sample mass (g)}}$$

AvO level is plotted graphically versus time to enable the maximum level of AvO and the time to achieve that maximum level to be determined.

Organic Silver Coating agent

An essential component of the compositions herein is a non-paraffin oil silver coating agent which is preferably incorporated at a level of from 0.05% to 10%, preferably from 0.1% to 5% by weight of the total composition.

The functional role of the silver coating agent is to form 'in use' a protective coating layer on any silverware components of the washload to which the compositions of the invention are being applied. The silver coating agent should hence have a high affinity for attachment to solid silver surfaces, particularly when present in as a component of an aqueous washing and bleaching solution with which the solid silver surfaces are being treated.

Suitable organic silver coating agents herein include fatty esters of mono- or polyhydric alcohols having from 1 to about 40 carbon atoms in the hydrocarbon chain.

The fatty acid portion of the fatty ester can be obtained from mono- or poly-carboxylic acids having from 1 to about 40 carbon atoms in the hydrocarbon chain. Suitable examples of monocarboxylic fatty acids include behenic acid, stearic acid, oleic acid, palmitic acid, myristic acid, lauric acid, acetic acid, propionic acid, butyric acid, isobutyric acid, valeric acid, lactic acid, glycolic acid and β,β'-dihydroxyisobutyric acid. Examples of suitable polycarboxylic acids include: n-butyl-malonic acid, isocitric acid, citric acid, maleic acid, malic acid and succinic acid.

The fatty alcohol radical in the fatty ester can be represented by mono- or polyhydric alcohols having from 1 to 40 carbon atoms in the hydrocarbon chain. Examples of suitable fatty alcohols include; behenyl, arachidyl, cocoyl, oleyl and lauryl alcohol, ethylene glycol, glycerol, ethanol, isopropanol, vinyl alcohol, diglycerol, xylitol, sucrose, erythritol, pentaerythritol, sorbitol or sorbitan.

Preferably, the fatty acid and/or fatty alcohol group of the fatty ester adjunct material have from 1 to 24 carbon atoms in the alkyl chain.

Preferred fatty esters herein are ethylene glycol, glycerol and sorbitan esters wherein the fatty acid portion of the ester normally comprises a species selected from behenic acid, stearic acid, oleic acid, palmitic acid or myristic acid.

The glycerol esters are also highly preferred. These are the mono-, di- or tri-esters of glycerol and the fatty acids as defined above.

Specific examples of fatty alcohol esters for use herein include: stearyl acetate, palmityl di-lactate, cocoyl isobutyrate, oleyl maleate, oleyl dimaleate, and tallowyl proprionate. Fatty acid esters useful herein include: xylitol monopalmitate, pentaerythritol monostearate, sucrose monostearate, glycerol monostearate, ethylene glycol monostearate, sorbitan esters. Suitable sorbitan esters include sorbitan monostearate, sorbitan palmitate, sorbitan monolaurate, sorbitan monomyristate, sorbitan monobehenate, sorbitan mono-oleate, sorbitan dilaurate, sorbitan distearate, sorbitan dibehenate, sorbitan dioleate, and also mixed tallowalkyl sorbitan mono- and di-esters.

Glycerol monostearate, glycerol mono-oleate, glycerol monopalmitate, glycerol monobehenate, and glycerol distearate are preferred glycerol esters herein.

Preferred organic silver coating agents include triglycerides, mono or diglycerides, and wholly or partially hydrogenated derivatives thereof, and any mixtures thereof. Suitable sources of fatty acid esters include vegetable and fish oils and animal fats. Suitable vegetable oils include soy bean oil, cotton seed oil, castor oil, olive oil, peanut oil, safflower oil, sunflower oil, rapeseed oil, grapeseed oil, palm oil and corn oil.

Waxes, including microcrystalline waxes are suitable organic silver coating agents herein. Preferred waxes have a melting point in the range from about 35° C. to about 110° C. and comprise generally from 12 to 70 carbon atoms. Preferred are petroleum waxes of the paraffin and microcrystalline type which are composed of long-chain saturated hydrocarbon compounds.

Alginates and gelatin are suitable organic silver coating agents herein.

Dialkyl amine oxides such as $C_{12}$–$C_{20}$ methylamine oxide, and dialkyl quaternary ammonium compounds and salts, such as the $C_{12}$–$C_{20}$ methylammonium halides are also suitable.

Other suitable organic silver coating agents include certain polymeric materials. Polyvinylpyrrolidones with an average molecular weight of from 12,000 to 700,000, polyethylene glycols (PEG) with an average molecular weight of from 600 to 10,000, polyamine N-oxide polymers, copolymers of N-vinylpyrrolidone and N-vinylimidazole, and cellulose derivatives such as methylcellulose, carboxymethylcellulose and hydroxyethylcellulose are examples of such polymeric materials.

Certain perfume materials, particularly those demonstrating a high substantivity for metallic surfaces, are also useful as the organic silver coating agents herein.

Organic silver coating agent—polymeric soil release agent

Polymeric soil release agents known to those skilled in the art of formulating laundry detergent compositions can be used as the organic silver coating agent herein.

Polymeric soil release agents are characterized by having both hydrophilic segments, to hydrophilize the surface of hydrophobic fibers, such as polyester and nylon, and hydrophobic segments, to deposit upon hydrophobic fibers and remain adhered thereto through completion of washing and rinsing cycles and, thus, serve as an anchor for the hydrophilic segments.

Suitable polymeric soil release agents include those soil release agents having: (a) one or more nonionic hydrophile components consisting essentially of (i) polyoxyethylene segments with a degree of polymerization of at least 2, or (ii) oxypropylene or polyoxypropylene segments with a degree of polymerization of from 2 to 10, wherein said hydrophile segment does not encompass any oxypropylene unit unless it is bonded to adjacent moieties at each end by ether linkages, or (iii) a mixture of oxyalkylene units comprising oxyethylene and from 1 to about 30 oxypropylene units wherein said mixture contains a sufficient amount of oxyethylene units such that the hydrophile component has hydrophilicity great enough to increase the hydrophilicity of conventional polyester synthetic fiber surfaces upon deposit of the soil release agent on such surface, said hydrophile segments preferably comprising at least about 25% oxyethylene units and more preferably, especially for such components having about 20 to 30 oxypropylene units, at least about 50% oxyethylene units; or (b) one or more hydrophobe components comprising (i) $C_3$ oxyalkylene terephthalate segments, wherein, if said hydrophobe components also comprise oxyethylene terephthalate, the ratio of oxyethylene terephthalate:$C_3$ oxyalkylene terephthalate units is about 2:1 or lower, (ii) $C_4$–$C_6$ alkylene or oxy $C_4$–$C_6$ alkylene segments, or mixtures therein, (iii) poly (vinyl ester) segments, preferably polyvinyl acetate, having a degree of polymerization of at least 2, or (iv) $C_1$–$C_4$ alkyl ether or $C_4$ hydroxyalkyl ether substituents, or mixtures therein, wherein said substituents are present in the form of $C_1$–$C_4$ alkyl ether or $C_4$ hydroxyalkyl ether cellulose derivatives, or mixtures therein, or a combination of (a) and (b).

Typically, the polyoxyethylene segments of (a)(i) will have a degree of polymerization of from about 200, although higher levels can be used, preferably from 3 to about 150, more preferably from 6 to about 100. Suitable oxy $C_4$–$C_6$alkylene hydrophobe segments include, but are not limited to, end-caps of polymeric soil release agents such as $MO_3S(CH_2)_nOCH_2CH_2O$—, where M is sodium and n is an integer from 4–6, as disclosed in U.S. Pat. No. 4,721,580, issued Jan. 26, 1988 to Gosselink.

Polymeric soil release agents useful herein also include cellulosic derivatives such as hydroxyether cellulosic polymers, copolymeric blocks of ethylene terephthalate or propylene terephthalate with polyethylene oxide or polypropylene oxide terephthalate, and the like. Such agents are commercially available and include hydroxyethers of cellulose such as METHOCEL (Dow). Cellulosic soil release agents for use herein also include those selected from the group consisting of $C_1$–$C_4$ alkyl and $C_4$ hydroxyalkyl cellulose; see U.S. Pat. No. 4,000,093, issued Dec. 28, 1976 to Nicol, et al.

Soil release agents characterized by poly(vinyl ester) hydrophobe segments include graft copolymers of poly (vinyl ester), e.g., $C_1$–$C_6$ vinyl esters, preferably poly(vinyl acetate) grafted onto polyalkylene oxide backbones, such as polyethylene oxide backbones. See European Patent Application 0 219 048, published Apr. 22, 1987 by Kud, et al.

Another suitable soil release agent is a copolymer having random blocks of ethylene terephthalate and polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

Another suitable polymeric soil release agent is a polyester with repeat units of ethylene terephthalate units contains 10–15% by weight of ethylene terephthalate units together with 90–80% by weight of polyoxyethylene terephthalate units, derived from a polyoxyethylene glycol of average molecular weight 300–5,000.

Another suitable polymeric soil release agent is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. 4,702,857, issued Oct. 27, 1987 to Gosselink. Other polymeric soil release agents also include the soil release agents of U.S. Pat. No. 4,877,896, issued Oct. 31, 1989 to Maldonado et al, which discloses anionic, especially sulfoarolyl, end-capped terephthalate esters.

Another soil release agent is an oligomer with repeat units of terephthaloyl units, sulfoisoterephthaloyl units, oxyethyleneoxy and oxy-1,2-propylene units. The repeat units form the backbone of the oligomer and are preferably terminated with modified isethionate end-caps. A particularly preferred soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)-ethanesulfonate.

Additional paraffin oil silver coating agent

A suitable additional organic silver coating agent is a paraffin oil, typically a predominantly branched aliphatic hydrocarbon having a number of carbon atoms in the range of from 20 to 50; preferred paraffin oil selected from predominantly branched $C_{25-45}$ species with a ratio of cyclic to noncyclic hydrocarbons of from 1:10 to 2:1, preferably from 1:5 to 1:1. A paraffin oil meeting these characteristics, having a ratio of cyclic to noncyclic hydrocarbons of about 32:68, is sold by Wintershall, Salzbergen, Germany, under the trade name WINOG 70.

Compositions containing mixtures of a paraffin oil and the non-paraffin oil organic silver coating agents described hereinbefore are envisaged.

Additional corrosion inhibitor

The compositions preferably contain an additional corrosion inhibitor compound which is preferably incorporated at a level of from 0.05% to 10%, preferably from 0.1% to 5% by weight of the total composition.

The most preferred additional corrosion inhibitor herein is benzotriazole and any derivatives thereof, including those disclosed in copending European Application No. 93201918.5.

Other suitable additional corrosion inhibitor compounds include, mercaptans and diols, especially mercaptans with 4 to 20 carbon atoms including lauryl mercaptan, thiophenol, thionapthol, thionalide and thioanthranol. Also suitable are saturated or unsaturated $C_{10}$–$C_{20}$ fatty acids, or their salts, especially aluminium tristearate. The $C_{12}$–$C_{20}$ hydroxy fatty acids, or their salts, are also suitable. Phosphonated octadecane and other anti-oxidants such as betahydroxytoluene (B/IT) are also suitable. Nitrogen-containing compounds such as amines, especially distearylamine and ammonium compounds such as ammonium chloride, ammonium bromide, ammonium sulphate or diammonium hydrogen citrate are also suitable. Certain Mn(II) salts including the halides, sulphate, carbonate and phosphate are also suitable.

Additional corrosion inhibitor—heavy metal ion sequestrant

The compositions may contain as an additional corrosion inhibitor component a heavy metal ion sequestrant, particularly an aminophosphonate heavy metal ion sequestrant. By heavy metal ion sequestrant it is meant herein components which act to sequester (chelate) heavy metal ions. These components may also have calcium and magnesium chelation capacity, but preferentially they show selectivity to binding heavy metal ions such as iron, manganese and copper.

Heavy metal ion sequestrants, which are acidic in nature, having for example phosphonic acid or carboxylic acid functionalities, may be present either in their acid form or as a complex/salt with a suitable counter cation such as an alkali or alkaline metal ion, ammonium, or substituted ammonium ion, or any mixtures thereof. Preferably any salts/complexes are water soluble. The molar ratio of said counter cation to the heavy metal ion sequestrant is preferably at least 1:1.

Suitable heavy metal ion sequestrants for use herein include organic phosphonates, such as the amino alkylene poly (alkylene phosphonates), alkali metal ethane 1-hydroxy disphosphonates and nitrilo trimethylene phosphonates.

Preferred among the above species are diethylene triamine penta (methylene phosphonate), ethylene diamine tri (methylene phosphonate) hexamethylene diamine tetra (methylene phosphonate) and hydroxy-ethylene 1,1 diphosphonate.

Other suitable heavy metal ion sequestrant for use herein include nitrilotriacetic acid and polyaminocarboxylic acids such as ethylenediaminotetracetic acid, ethylenetriamine pentacetic acid, ethylenediamine disuccinic acid, ethylenediamine diglutaric acid, 2-hydroxypropylenediamine disuccinic acid or any salts thereof.

Especially preferred is ethylenediamine-N,N'-disuccinic acid (EDDS) or the alkali metal, alkaline earth metal, ammonium, or substituted ammonium salts thereof, or mixtures thereof. Preferred EDDS compounds are the free acid form and the sodium or magnesium salt or complex thereof. Examples of such preferred sodium salts of EDDS include $Na_2$EDDS and $Na_3$EDDS. Examples of such preferred magnesium complexes of EDDS include MgEDDS and $Mg_2$EDDS.

Other suitable heavy metal ion sequestrants for use herein are iminodiacetic acid derivatives such as 2-hydroxyethyl diacetic acid or glyceryl imino diacetic acid, described in EP-A-317,542 and EP-A-399,133.

The iminodiacetic acid-N-2-hydroxypropyl sulfonic acid and aspartic acid N-carboxymethyl N-2-hydroxypropyl-3-sulfonic acid sequestrants described in EP-A-516,102 are also suitable herein. The β-alanine-N,N'-diacetic acid, aspartic acid-N,N'-diacetic acid, aspartic acid-N-monoacetic acid and iminodisuccinic acid sequestrants described in EP-A-509,382 are also suitable.

EP-A-476,257 describes suitable amino based sequestrants. EP-A-510,331 describes suitable sequestrants derived from collagen, keratin or casein. EP-A-528,859 describes a suitable alkyl iminodiacetic acid sequestrant. Dipicolinic acid and 2-phosphonobutane-1,2,4-tricarboxylic acid are also suitable. Glycinamide-N,N'-disuccinic acid (GADS) is also suitable.

In a highly preferred processing aspect, providing enhanced sequestrant stability and good granule flexibility characteristics, any heavy metal ion sequestrant, particularly where said sequestrant is an amino alkylene poly (alkylene phosphonate), is first stabilized by premixing with a magnesium salt, and then sprayed onto a powdered inert carrier material prior to incorporation in granular compositions in accord with the invention. The inert carrier material may, for example, comprise sodium sulphate, sodium carbonate or sodium citrate. Preferably, a drying step to remove excess moisture is included after the spraying-on and prior to incorporation of the granules, to provide further enhanced granule stability.

Detergent compositions

The bleaching compositions of the invention are preferably incorporated as part of detergent compositions containing certain detergent components. The precise nature of these detergent components, and levels of incorporation thereof will depend on the physical form of the composition, and the nature of the cleaning operation for which it is to be used.

When formulated as compositions suitable for use in a machine washing method, eg: machine dishwashing methods, the detergent compositions preferably contain one or more detergent components selected from surfactants, water-insoluble builders, organic polymeric compounds, enzymes, suds suppressors, lime soap dispersants, soil suspension and anti-redeposition agents.

Surfacant

The detergent compositions may contain a surfactant selected from anionic, cationic, nonionic ampholytic, amphoteric and zwitterionic surfactants and mixtures thereof.

The surfactant is typically present at a level of from 0.1% to 60% by weight. More preferred levels of incorporation of surfactant are from 1% to 35% by weight, most preferably from 1% to 20% by weight.

The surfactant is preferably formulated to be compatible with any enzyme components present in the composition. In liquid or gel compositions the surfactant is most preferably formulated such that it promotes, or at least does not degrade, the stability of any enzyme in these compositions.

A typical listing of anionic, nonionic, ampholytic, and zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). A list of suitable cationic surfactants is given in U.S. Pat. No. 4,259,217 issued to Murphy on Mar. 31, 1981.

Where present, ampholytic, amphoteric and zwitteronic surfactants are generally used in combination with one or more anionic and/or nonionic surfactants.

Anionic surfactant

Essentially any anionic surfactants useful for detersive purposes can be included in the compositions. These can include salts (including, for example, sodium, potassium, ammonium, and substituted ammonium salts such as mono-, di- and triethanolamine salts) of the anionic sulfate, sulfonate, carboxylate and sarcosinate surfactants.

Other anionic surfactants include the isethionates such as the acyl isethionates, N-acyl taurates, fatty acid amides of methyl tauride, alkyl succinates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), N-acyl sarcosinates. Resin acids and hydrogenated resin acids are also suitable, such as rosin, hydrogenated rosin, and resin acids and hydrogenated resin acids present in or derived from tallow oil.

Anionic sulfate surfactant

Anionic sulfate surfactants suitable for use herein include the linear and branched primary alkyl sulfates, alkyl ethoxysulfates, fatty oleyl glycerol sulfates, alkyl phenol ethylene oxide ether sulfates, the $C_5$–$C_{17}$ acyl-N-($C_1$–$C_4$ alkyl) and —N-($C_1$–$C_2$ hydroxyalkyl) glucamine sulfates, and sulfates of alkylpolysaccharides such as the sulfates of alkylpolyglucoside (the nonionic nonsulfated compounds being described herein).

Alkyl ethoxysulfate surfactants are preferably selected from the group consisting of the $C_6$–$C_{18}$ alkyl sulfates which have been ethoxylated with from about 0.5 to about 20 moles of ethylene oxide per molecule. More preferably, the alkyl ethoxysulfate surfactant is a $C_6$–$C_{18}$ alkyl sulfate which has been ethoxylated with from about 0.5 to about 20, preferably from about 0.5 to about 5, moles of ethylene oxide per molecule.

Anionic sulfonate surfactant

Anionic sulfonate surfactants suitable for use herein include the salts of $C_5$–$C_{20}$ linear alkylbenzene sulfonates, alkyl ester sulfonates, $C_6$–$C_{22}$ primary or secondary alkane sulfonates, $C_6$–$C_{24}$ olefin sulfonates, sulfonated polycarboxylic acids, alkyl glycerol sulfonates, fatty acyl glycerol sulfonates, fatty oleyl glycerol sulfonates, and any mixtures thereof.

Anionic carboxylate surfactant

Anionic carboxylate surfactants suitable for use herein include the alkyl ethoxy carboxylates, the alkyl polyethoxy polycarboxylate surfactants and the soaps ('alkyl carboxyls'), especially certain secondary soaps as described herein.

Preferred alkyl ethoxy carboxylates for use herein include those with the formula $RO(CH_2CH_2O)_xCH_2COO^{31}M^+$ wherein R is a $C_6$ to $C_{18}$ alkyl group, x ranges from 0 to 10, and the ethoxylate distribution is such that, on a weight basis, the amount of material where x is 0 is less than about 20%, and the amount of material where x is greater than 7, is less than about 25%, the average x is from about 2 to 4 when the average R is $C_{13}$ or less, and the average x is from about 3 to 10 when the average R is greater than $C_{13}$, and M is a cation, preferably chosen from alkali metal, alkaline earth metal, ammonium, mono-, di-, and tri-ethanolammonium, most preferably from sodium, potassium, ammonium and mixtures thereof with magnesium ions. The preferred alkyl ethoxy carboxylates are those where R is a $C_{12}$ to $C_{18}$ alkyl group.

Alkyl polyethoxy polycarboxylate surfactants suitable for use herein include those having the formula $$RO-(CHR_1-CHR_2-O)-R_3$$

wherein R is a $C_6$ to $C_{18}$ alkyl group, x is from 1 to 25, $R_1$ and $R_2$ are selected from the group consisting of hydrogen, methyl acid radical, succinic acid radical, hydroxysuccinic acid radical, and mixtures thereof, wherein at least one $R_1$ or $R_2$ is a succinic acid radical or hydroxysuccinic acid radical, and $R_3$ is selected from the group consisting of hydrogen, substituted or unsubstituted hydrocarbon having between 1 and 8 carbon atoms, and mixtures thereof.

Anionic secondary soap surfactant

Preferred soap surfactants are secondary soap surfactants which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants should preferably contain no ether linkages, no ester linkages and no hydroxyl groups. There should preferably be no nitrogen atoms in the head-group (amphiphilic portion). The secondary soap surfactants usually contain 11–15 total carbon atoms, although slightly more (e.g., up to 16) can be tolerated, e.g. p-octyl benzoic acid.

The following general structures further illustrate some of the preferred secondary soap surfactants:

A. A highly preferred class of secondary soaps comprises the secondary carboxyl materials of the formula $R^3CH(R^4)COOM$, wherein $R^3$ is $CH_3(CH_2)x$ and $R^4$ is $CH_3(CH_2)y$, wherein y can be 0 or an integer from 1 to 4, x is an integer from 4 to 10 and the sum of (x +y) is 6–10, preferably 7–9, most preferably 8.

B. Another preferred class of secondary soaps comprises those carboxyl compounds wherein the carboxyl substituent is on a ring hydrocarbyl unit, i.e., secondary soaps of the formula $R^5—R^6—COOM$, wherein $R^5$ is $C^7$–$C^{10}$, preferably $C^8$–$C^9$, alkyl or alkenyl and $R^6$ is a ring structure, such as benzene, cyclopentane and cyclohexane. (Note: $R^5$ can be in the ortho, meta or para position relative to the carboxyl on the ring.)

C. Still another preferred class of secondary soaps comprises secondary carboxyl compounds of the formula $CH_3(CHR)_k—(CH_2)_m—(CHR)_n—CH(COOM)(CHR)_o—(CH_2)_p—(CHR)_q—CH_3$, wherein each R is $C_1$–$C_4$ alkyl, wherein k, n, o, q are integers in the range of 0–8, provided that the total number of carbon atoms (including the carboxylate) is in the range of 10to 18.

In each of the above formulas A, B and C, the species M can be any suitable, especially water-solubilizing, counterion.

Especially preferred secondary soap surfactants for use herein are water-soluble members selected from the group consisting of the water-soluble salts of 2-methyl-1-undecanoic acid, 2-ethyl-1-decanoic acid, 2-propyl-1-nonanoic acid, 2-butyl-1-octanoic acid and 2-pentyl-1-heptanoic acid.

Alkali metal sarcosinate surfactant

Other suitable anionic surfactants are the alkali metal sarcosinates of formula $R—CON(R^1)CH_2$ COOM, wherein R is a $C_5$–$C_{17}$ linear or branched alkyl or alkenyl group, $R^1$ is a $C_1$–$C_4$ alkyl group and M is an alkali metal ion. Preferred examples are the myristyl and oleyl methyl sarcosinates in the form of their sodium salts.

Nonionic surfactant

Essentially any anionic surfactants useful for detersive purposes can be included in the compositions. Exemplary, non-limiting classes of useful nonionic surfactants are listed below.

Nonionic polyhydroxy fatty acid amide surfactant

Polyhydroxy fatty acid amides suitable for use herein are those having the structural formula $R^2CONR^1Z$ wherein: R1 is H, $C_1$–$C_4$ hydrocarbyl, 2-hydroxy ethyl, 2-hydroxy propyl, or a mixture thereof, preferable C1–C4 alkyl, more preferably $C_1$ or $C_2$ alkyl, most preferably $C_1$ alkyl (i.e., methyl); and $R_2$ is a $C_5$–$C_{31}$ hydrocarbyl, preferably straight-chain $C_5$–$C_{19}$ alkyl or alkenyl, more preferably straight-chain $C_9$–$C_{17}$ alkyl or alkenyl, most preferably straight-chain $C_{11}$–$C_{17}$ alkyl or alkenyl, or mixture thereof; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z preferably will be derived from a reducing sugar in a reductive amination reaction; more preferably Z is a glycityl.

Nonionic condensates of alkyl phenols

The polyethylene, polypropylene, and polybutylene oxide condensates of alkyl phenols are suitable for use herein. In general, the polyethylene oxide condensates are preferred. These compounds include the condensation products of alkyl phenols having an alkyl group containing from about 6 to about 18 carbon atoms in either a straight chain or branched chain configuration with the alkylene oxide.

Nonionic ethoxylated alcohol surfactant

The alkyl ethoxylate condensation products of aliphatic alcohols with from about 1 to about 25 moles of ethylene oxide are suitable for use herein. The alkyl chain of the aliphatic alcohol can either be straight or branched, primary or secondary, and generally contains from 6 to 22 carbon atoms. Particularly preferred are the condensation products of alcohols having an alkyl group containing from 8 to 20 carbon atoms with from about 2 to about 10 moles of ethylene oxide per mole of alcohol.

Nonionic ethoxylated/propoxylated fatty alcohol surfactant

The ethoxylated $C_6$–$C_{18}$ fatty alcohols and $C_6$–$C_{18}$ mixed ethoxylated/propoxylated fatty alcohols are suitable surfactants for use herein, particularly where water soluble. Preferably the ethoxylated fatty alcohols are the $C_{10}$–$C_{18}$ ethoxylated fatty alcohols with a degree of ethoxylation of from 3 to 50, most preferably these are the $C_{12}$–$C_{18}$ ethoxylated fatty alcohols with a degree of ethoxylation from 3 to 40. Preferably the mixed ethoxylated/propoxylated fatty alcohols have an alkyl chain length of from 10 to 18 carbon atoms, a degree of ethoxylation of from 3 to 30 and a degree of propoxylation of from 1 to 10.

Nonionic EO/PO condensates with propylene glycol

The condensation products of ethylene oxide with a hydrophobic base formed by the condensation of propylene oxide with propylene glycol are suitable for use herein. The hydrophobic portion of these compounds preferably has a molecular weight of from about 1500 to about 1800 and exhibits water insolubility. Examples of compounds of this type include certain of the commercially-available Pluronic™ surfactants, marketed by BASF.

Nonionic EO condensation products with propylene oxide/ethylene diamine adducts

The condensation products of ethylene oxide with the product resulting from the reaction of propylene oxide and ethylenediamine are suitable for use herein. The hydrophobic moiety of these products consists of the reaction product of ethylenediamine and excess propylene oxide, and generally has a molecular weight of from about 2500 to about 3000. Examples of this type of nonionic surfactant include certain of the commercially available Tetronic™ compounds, marketed by BASF.

Nonionic alkylpolysaccharide surfactant

Suitable alkylpolysaccharides for use herein are disclosed in U.S. Pat. No. 4,565,647, Llenado, issued Jan. 21, 1986, having a hydrophobic group containing from about 6 to about 30 carbon atoms, preferably from about 10 to about 16 carbon atoms and a polysaccharide, e.g., a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6- positions on the preceding saccharide units.

The preferred alkylpolyglycosides have the formula $$R^2O(C_nH_{2n}O)t(glycosyl)_x$$

wherein R2 is selected from the group consisting of alkyl, alkylphenyl, hydroxyalkyl, hydroxyalkylphenyl, and mixtures thereof in which the alkyl groups contain from 10 to 18, preferably from 12 to 14, carbon atoms; n is 2 or 3; t is from 0 to 10, preferably 0, and X is from 1.3 to 8, preferably from 1.3 to 3, most preferably from 1.3 to 2.7. The glycosyl is preferably derived from glucose.

Nonionic fatty acid amide surfactant

Fatty acid amide surfactants suitable for use herein are those having the formula: $R^6CON(R^7)_2$ wherein $R^6$ is an alkyl group containing from 7 to 21, preferably from 9 to 17 carbon atoms and each $R^7$ is selected from the group consisting of hydrogen, $C_1$–$C_4$ alkyl, $C_1$–$C_4$ hydroxyalkyl, and —$(C_2H_4O)_xH$, where x is in the range of from 1 to 3.

Amphoteric surfactant

Suitable amphoteric surfactants for use herein include the amine oxide surfactants and the alkyl amphocarboxylic acids.

A suitable example of an alkyl aphodicarboxylic acid for use herein is Miranol(TM) C2M Conc. manufactured by Miranol, Inc., Dayton, N.J.

Amine Oxide surfactant

Amine oxides useful herein include those compounds having the formula $R^3(OR^4)_xN^0(R^5)_2$ wherein $R^3$ is selected from an alkyl, hydroxyalkyl, acylamidopropoyl and alkyl phenyl group, or mixtures thereof, containing from 8 to 26 carbon atoms, preferably 8 to 18 carbon atoms; $R^4$ is an alkylene or hydroxyalkylene group containing from 2 to 3 carbon atoms, preferably 2 carbon atoms, or mixtures thereof; x is from 0 to 5, preferably from 0 to 3; and each $R^5$ is an alkyl or hydyroxyalkyl group containing from 1 to 3, preferably from 1 to 2 carbon atoms, or a polyethylene oxide group containing from 1 to 3, preferable 1, ethylene oxide groups. The $R^5$ groups can be attached to each other, e.g., through an oxygen or nitrogen atom, to form a ring structure.

These mine oxide surfactants in particular include $C_{10}$–$C_{18}$ alkyl dimethylamine oxides and $C_8$–$C_{18}$ alkoxy ethyl dihydroxyethyl amine oxides. Examples of such materials include dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, dodecylamidopropyl dimethylamine oxide, cetyl dimethylamine oxide, stearyl dimethylamine oxide, tallow dimethylamine oxide and dimethyl-2-hydroxyoctadecylamine oxide. Preferred are $C_{10}$–$C_{18}$ alkyl dimethylamine oxide, and $C_{10-18}$ acylamido alkyl dimethylamine oxide.

Zwitterionic surfactant

Zwitterionic surfactants can also be incorporated into the detergent compositions hereof. These surfactants can be broadly described as derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are exemplary zwitterionic surfactants for use herein.

Betaine surfactant

The betaines useful herein are those compounds having the formula $R(R')_2N^+R^2COO^-$ wherein R is a $C_6$–$C_{18}$ hydrocarbyl group, preferably a $C_{10}$–$C_{16}$ alkyl group or $C_{10-16}$ acylamido alkyl group, each $R^1$ is typically $C_1$–$C_3$ alkyl, preferably methyl, m and $R^2$ is a $C_1$–$C_5$ hydrocarbyl group, preferably a $C_1$–$C_3$ alkylene group, more preferably a $C_1$–$C_2$ alkylene group. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4[$C_{14-16}$ acylmethylamidodiethylammonio]-1-carboxybutane; $C_{16-18}$ acylamidodimethylbetaine; $C_{12-16}$ acylamidopentanediethyl-betaine; [$C_{12-16}$ acylmethylamidodimethylbetaine. Preferred betaines are $C_{12-18}$ dimethyl-ammonio hexanoate and the $C_{10-18}$ acylamidopropane (or ethane) dimethyl (or diethyl) betaines. Complex betaine surfactants are also suitable for use herein.

Sultaine surfactant

The sultaines useful herein are those compounds having the formula $(R(R^1)_2N^+R^2SO_3$— wherein R is a $C_6$–$C_{18}$ hydrocarbyl group, preferably a $C_{10}$–$C_{16}$ alkyl group, more preferably a $C_{12}$–$C_{13}$ alkyl group, each $R^1$ is typically $C_1$–$C_3$ alkyl, preferably methyl, and $R^2$ is a $C_1$–$C_6$ hydrocarbyl group, preferably a $C_1$–$C_3$ alkylene or, preferably, hydroxyalkylene group.

Ampholytic surfactant

Ampholytic surfactants can be incorporated into the detergent compositions herein. These surfactants can be broadly described as aliphatic derivatives of secondary or tertiary amines, or aliphatic derivatives of heterocyclic secondary and tertiary amines in which the aliphatic radical can be straight chain or branched.

Cationic surfactants

Cationic surfactants can also be used in the detergent compositions herein. Suitable cationic surfactants include the quaternary ammonium surfactants selected from mono $C_6$–$C_{16}$, preferably $C_6$–$C_{10}$ N-alkyl or alkenyl ammonium surfactants wherein the remaining N positions are substituted by methyl, hydroxyethyl or hydroxypropyl groups.

Water-soluble builder compound

The detergent compositions may contain as a highly preferred component a water-soluble builder compound, typically present at a level of from 1% to 80% by weight, preferably from 10% to 70% by weight, most preferably from 20% to 60% by weight of the composition.

Suitable water-soluble builder compounds include the water soluble monomeric polycarboxylates, or their acid forms, homo or copolymeric polycarboxylic acids or their salts in which the polycarboxylic acid comprises at least two carboxylic radicals separated from each other by not more that two carbon atoms, carbonates, bicarbonates, borates, phosphates, silicates and mixtures of any of the foregoing.

The carboxylate or polycarboxylate builder can be momomeric or oligomeric in type although monomeric polycarboxylates are generally preferred for reasons of cost and performance.

Suitable carboxylates containing one carboxy group include the water soluble salts of lactic acid, glycolic acid and ether derivatives thereof. Polycarboxylates containing two carboxy groups include the water-soluble salts of succinic acid, malonic acid, (ethylenedioxy) diacetic acid, maleic acid, diglycolic acid, tartaric acid, tartronic acid and fumaric acid, as well as the ether carboxylates and the sulfinyl carboxylates. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in British Patent No. 1,389,732, and aminosuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398, 421 and 1,398,422 and in U.S. Pat. No.. 3,936,448, and the sulfonated pyrolysed citrates described in British Patent No. 1,439,000.

Alicyclic and heterocyclic polycarboxylates include cyclopentane-cis,cis,cis-tetracarboxylates, cyclopentadienide pentacarboxylates, 2,3,4,5-tetrahydrofuran-cis, cis, cis-tetracarboxylates, 2,5-tetrahydrofuran-cis-dicarboxylates, 2,2,5,5-tetrahydrofuran-tetracarboxylates, 1,2,3,4,5,6-hexane-hexacarboxylates and carboxymethyl derivatives of polyhydric alcohols such as sorbitol, mannitol and xylitol. Aromatic polycarboxylates include mellitic acid, pyromellitic acid and the phthalic acid derivatives disclosed in British Patent No. 1,425,343.

Of the above, the preferred polycarboxylates are hydroxycarboxylates containing up to three carboxy groups per molecule, more particularly titrates.

The parent acids of the monomeric or oligomeric polycarboxylate chelating agents or mixtures thereof with their salts, e.g. citric acid or titrate/citric acid mixtures are also contemplated as useful builder components.

Borate builders, as well as builders containing borate-forming materials that can produce borate under detergent storage or wash conditions can also be used but are not preferred at wash conditions less that about 50° C., especially less than about 40° C.

Examples of carbonate builders are the alkaline earth and alkali metal carbonates, including sodium carbonate and sesqui-carbonate and mixtures thereof with ultra-fine calcium carbonate as disclosed in German Patent Application No. 2,321,001 published on Nov. 15, 1973.

Specific examples of water-soluble phosphate builders are the alkali metal tripolyphosphates, sodium, potassium and ammonium pyrophosphate, sodium and potassium and ammonium pyrophosphate, sodium and potassium orthophosphate, sodium polymeta/phosphate in which the degree of polymerization ranges from about 6 to 21, and salts of phytic acid.

Suitable silicates include the water soluble sodium silicates with an $SiO_2$:$Na_2O$ ratio of from 1.0 to 2.8, with ratios of from 1.6 to 2.4 being preferred, and 2.0 ratio being most preferred. The silicates may be in the form of either the anhydrous salt or a hydrated salt. Sodium silicate with an $SiO_2$:$Na_2O$ ratio of 2.0 is the most preferred silicate.

Silicates are preferably present in the detergent compositions in accord with the invention at a level of from 5% to 50% by weight of the composition, more preferably from 10% to 40% by weight.

Partially soluble or insoluble builder compound

The detergent compositions of the present invention may contain a partially soluble or insoluble builder compound, typically present at a level of from 1% to 80% by weight, preferably from 10% to 70% by weight, most preferably from 20% to 60% weight of the composition.

Examples of partially water soluble builders include the crystalline layered silicates. Examples of largely water insoluble builders include the sodium aluminosilicates.

Crystalline layered sodium silicates have the general formula $$NaMSi_xO_{2x+1}.yH_2O$$

wherein M is sodium or hydrogen, x is a number from 1.9 to 4 and y is a number from 0 to 20. Crystalline layered sodium silicates of this type are disclosed in EP-A-0164514 and methods for their preparation are disclosed in DE-A-3417649 and DE-A-3742043. For the purpose of the present invention, x in the general formula above has a value of 2, 3 or 4 and is preferably 2. The most preferred material is $\delta$-$Na_2Si_2O_5$, available from Hoechst AG as NaSKS-6.

The crystalline layered sodium silicate material is preferably present in granular detergent compositions as a particulate in intimate admixture with a solid, water-soluble ionisable material. The solid, water-soluble ionisable material is selected from organic acids, organic and inorganic acid salts and mixtures thereof.

Suitable aluminosilicate zeolites have the unit cell formula $Na_z[(AlO_2)_z(SiO_2)y]$. $XH_2O$ wherein z and y are at least 6; the molar ratio of z to y is from 1.0 to 0.5 and x is at least 5, preferably from 7.5 to 276, more preferably from 10 to 264. The aluminosilicate material are in hydrated form and are preferably crystalline, containing from 10% to 28%, more preferably from 18% to 22% water in bound form.

The aluminosilicate ion exchange materials can be naturally occurring materials, but are preferably synthetically derived. Synthetic crystalline aluminosilicate ion exchange materials are available under the designations Zeolite A, Zeolite B, Zeolite P, Zeolite X, Zeolite MAP, Zeolite HS and mixtures thereof. Zeolite A has the formula $$Na_{12}[AlO_2)_{12}(SiO_2)_{12}].xH_2O$$

wherein x is from 20 to 30, especially 27. Zeolite X has the formula $Na_{86}$ $[(AlO_2)_{86}(SiO_2)_{106}].276H_2O$.

Inorganic potassium salt deposit inhibitor

The compositions may, in a preferred aspect, additionally contain low levels of certain potassium slats to inhibit the formation of deposits on the tableware. Such deposits typically comprise insoluble carbonate salts and are most often formed in hard water conditions or when the composition is formulated to include a carbonate or phosphate builder. The deposits manifest themselves as spots, films or smears on the tableware, which are typically white in colour. The potassium salts may be incorporated at levels of from 0.1% to 10%, more preferably from 0.2% to 1% by weight. Suitable potassium slats include potassium chloride, potassium carbonate, potassium sulfate, and any of the potassium pyrophosphates and phosphates. The Applicant's U.S. Pat. No. 5,180,515 discloses, in more detail, further suitable potassium salts and preferred means of incorporation of the salts into granular compositions.

Bleach catalyst

The compositions may contain a transition metal containing bleach catalyst. The use of certain bleach catalysts, such as particular Mn(III) or Mn(IV) bleach catalysts, has been shown to result in a propensity for silver tarnishing, which can be conveniently addressed using the solution provided by the current invention.

The bleach catalyst is used in a catalytically effective amount in the compositions and processes herein. By "catalytically effective amount" is meant an amount which is sufficient, under whatever comparative test conditions are employed, to enhance bleaching and removal of the stain or stains of interest from the target substrate. For automatic dishwashing, the target substrate may be, for example, a porcelain cup or dish with tea stain or a polyethylene dish stained with tomato soup. The test conditions will vary, depending on the type of washing appliance used and the habits of the user. Some users elect to use very hot water; others use warm or even cold water in machine dishwashing operations. Of course, the catalytic performance of the bleach catalyst will be affected by such considerations, and the levels of bleach catalyst used in fully-formulated detergent and bleach compositions can be appropriately adjusted. As a practical matter, and not by way of limitation, the compositions and processes herein can be adjusted to provide on the order of at least one part per ten million of the active bleach catalyst species in the aqueous washing liquor, and will preferably provide from about 1 ppm to about 200 ppm of the catalyst species in the wash liquor. To illustrate this point further, on the order of 3 micromolar manganese catalyst is effective at 40° C., pH 10 under European conditions using perborate and a bleach precursor (e.g., benzoyl caprolactam). An increase in concentration of 3–5 fold may be required under U.S. conditions to achieve the same results. Conversely, use of a bleach precusor and the manganese catalyst with perborate may allow the formulator to achieve equivalent bleaching at lower perborate usage levels than products without the manganese catalyst.

The bleach catalyst material herein can comprise the free acid or be in the form of any suitable salts.

One type of bleach catalyst is a catalyst system comprising a heavy metal cation of defined bleach catalytic activity, such as copper, iron or manganese cations, an auxiliary metal cation having little or no bleach catalytic activity, such as zinc or aluminum cations, and a sequestrant having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

Other types of bleach catalysts include the manganese-based complexes disclosed in U.S. Pat. No. 5,246,621 and U.S. Pat. No. 5,244,594. Preferred examples of these catalysts include $Mn^{IV}_2(u-O)_3$(1,4,7-trimethyl-1,4,7-triazacyclononane)$_2$-$(PF_6)_2$, $Mn^{III}_2(u-O)_1(u-OAc)_2$(1,4,7-trimethyl-1,4,7-triazacyclononane)$_2$-$(ClO_4)_2$, $Mn^{IV}_4(u-O)_6$(1,4,7-triazacyclononane)$_4$-$(ClO_4)_2$, $Mn^{III}Mn^{IV}_4(U-O)_1(U-OAc)_2$-(1,4,7-trimethyl-1,4,7-triazacyclononane)$_2$-$(ClO_4)_3$, and mixtures thereof. Others are described in European patent application publication no. 549,272. Other ligands suitable for use herein include 1,5,9-trimethyl-1,5,9-triazacyclodedecane, 2-methyl-1,4,7-triazacyclononane, 2-methyl-1,4,7-triazacyclononane, 1,2,4,7-tetramethyl-1,4,7-triazacyclononane, and mixtures thereof.

For examples of suitable bleach catalysts see U.S. Pat. No. 4,246,612 and U.S. Pat. No. 5,227,084. See also U.S. Pat. No. 5,194,416 which teaches mononuclear manganese (IV) complexes such as Mn(1,4,7-trimethyl-1,4,7-triazacyclononane)$(OCH_3)_3$-$(PF_6)$.

Still another type of bleach catalyst, as disclosed in U.S. Pat. No. 5,114,606, is a water-soluble complex of manganese (III), and/or (IV) with a ligand which is a non-carboxylate polyhydroxy compound having at least three consecutive C—OH groups. Preferred ligands include sorbitol, iditol, dulsitol, mannitol, xylithol, arabitol, adonitol, meso-erythritol, meso-inositol, lactose, and mixtures thereof.

U.S. Pat. No. 5,114,611 teaches a bleach catalyst comprising a complex of transition metals, including Mn, Co, Fe, or Cu, with an non-(macro)-cyclic ligand. Said ligands are of the formula:

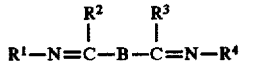

wherein $R^1$, $R^2$, $R^3$, and $R^4$ can each be selected from H, substituted alkyl and aryl groups such that each $R_1$—N=C—$R^2$ and $R_3$—C=N—$R^4$ form a five or six-membered ring. Said ring can further be substituted. B is a bridging group selected from O, S. $CR^5R^6$, $NR^7$ and C=O, wherein $R^5$, $R^6$, and $R^7$ can each be H, alkyl, or aryl groups, including substituted or unsubstituted groups. Preferred ligands include pyridine, pyridazine, pyrimidine, pyrazine, imidazole, pyrazole, and triazole rings. Optionally, said rings may be substituted with substituents such as alkyl, aryl, alkoxy, halide, and nitro. Particularly preferred is the ligand 2,2'-bispyridylamine. Preferred bleach catalysts include Co, Cu, Mn, Fe,-bispyridylmethane and -bispyridylamine complexes. Highly preferred catalysts include Co(2,2'-bispyridylamine)$Cl_2$, Di(isothiocyanato) bispyridylamine-cobalt (II), trisdipyridylamine-cobalt(II) perchlorate, Co(2,2-bispyridylamine)$_2O_2ClO_4$, Bis-(2,2'-bispyridylamine) copper(II) perchlorate, tris(di-2-pyridylamine) iron(II) perchlorate, and mixtures thereof.

Other examples include binuclear Mn complexed with tetra-N-dentate and bi-N-dentate ligands, including $N_4Mn^{III}(u-O)_2Mn^{IV}N_4)^+$ and $[Bipy_2Mn^{III}(u-O)_2Mn^{IV}bipy_2]$-$(ClO_4)_3$.

Other bleach catalysts are described, for example, in European patent application, publication no. 408,131 (cobalt complex catalysts), European patent applications, publication nos. 384,503, and 306,089 (metallo-porphyrin catalysts), U.S. Pat. No. 4,728,455 (manganese/multidentate ligand catalyst), U.S. Pat. No. 4,711,748 and European patent application, publication no. 224,952, (absorbed manganese on aluminosilicate catalyst), U.S. Pat. No. 4,601,845 (aluminosilicate support with manganese and zinc or magnesium salt), U.S. Pat. No. 4,626,373 (manganese/ligand catalyst), U.S. Pat. No. 4,119,557 (ferric complex catalyst), German Pat. specification 2,054,019 (cobalt chelant catalyst) Canadian 866,191 (transition metal-containing salts), U.S. Pat. No. 4,430,243 (chelants with manganese cations and non-catalytic metal cations), and U.S. Pat. No. 4,728,455 (manganese gluconate catalysts).

Enzyme

Another optional ingredient useful in the detergent compositions is one or more enzymes.

Preferred additional enzymatic materials include the commercially available lipases, amylases, neutral and alkaline proteases, esterases, cellulases, pectinases, lactases and peroxidases conventionally incorporated into detergent compositions. Suitable enzymes are discussed in U.S. Pat. Nos. 3,519,570 and 3,533,139.

Preferred commercially available protease enzymes include those sold under the tradenames Alcalase, Savinase, Primase, Durazym, and Esperase by Novo Industries A/S (Denmark), those sold under the tradename Maxatase, Maxacal and Maxapem by Gist-Brocades, those sold by Genencor International, and those sold under the tradename Opticlean and Optimase by Solvay Enzymes. Protease enzyme may be incorporated into the compositions in accordance with the invention at a level of from 0.0001% to 4% active enzyme by weight of the composition.

Preferred amylases include, for example, a-amylases obtained from a special strain of B licheniformis, described in more detail in GB-1,269,839 (Novo). Preferred commercially available amylases include for example, those sold under the tradename Rapidase by Gist-Brocades, and those sold under the tradename Termamyl and BAN by Novo Industries A/S. Amylase enzyme may be incorporated into the composition in accordance with the invention at a level of from 0.0001% to 2% active enzyme by weight of the composition.

Lipolytic enzyme (lipase) may be present at levels of active lipolytic enzyme of from 0.0001% to 2% by weight, preferably 0.001% to 1% by weight, most preferably from 0.001% to 0.5% by weight of the compositions.

The lipase may be fungal or bacterial in origin being obtained, for example, from a lipase producing strain of Humicola sp., Thermomyces sp. or Pseudomonas sp. including *Pseudomonas pseudoalcaligenes* or *Pseudomas fluorescens*. Lipase from chemically or genetically modified mutants of these strains are also useful herein.

A preferred lipase is derived from Pseudomonas pseudoalcaligenes, which is described in Granted European Patent, EP-B-0218272.

Another preferred lipase herein is obtained by cloning the gene from *Humicola lanuginosa* and expressing the gene in *Aspergillus oryza*, as host, as described in European Patent Application, EP-A-0258 068, which is commercially available from Novo Industri A/S, Bagsvaerd, Denmark, under the trade name Lipolase. This lipase is also described in U.S. Pat. No. 4,810,414, Huge-Jensen et al, issued Mar. 7, 1989.

Where the enzyme is a protease, the ultimate amount in a typical wash solution is from 0.1 to 100 KNPU, but preferably is from 0.5 to 50 KNPU, more preferably from 3 to 30 KNPU.

Where the enzyme is an amylase, the ultimate amount in a typical wash solution is from 1 to 1500 KNU, but preferably is from 5 to 1200 KNU, more preferably from 30 to 450 KNU.

Where the enzyme is a lipase, the ultimate amount in a typical wash solution is from 1 to 300 KLU, but preferably is from 10 to 200 KLU, more preferably from 10 to 100 KLU.

Where the enzyme is a cellulase, the ultimate amount in the wash is typically from 10 to 1200 CEVU, but preferably is from 50 to 1000 CEVU, more preferably from 80 to 500 CEVU.

Enzyme Stabilizing System

Preferred enzyme-containing compositions herein may comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such stabilizing systems can comprise calcium ion, boric acid, propylene glycol, short chain carboxylic acid, boronic acid, and mixtures thereof. Such stabilizing systems can also comprise reversible enzyme inhibitors, such as reversible protease inhibitors.

The compositions herein may further comprise from 0 to about 10%, preferably from about 0.01% to about 6% by weight, of chlorine bleach scavengers, added to prevent chlorine bleach species present in many water supplies from attacking and inactivating the enzymes, especially under alkaline conditions. While chlorine levels in water may be small, typically in the range from about 0.5 ppm to about 1.75 ppm, the available chlorine in the total volume of water that comes in contact with the enzyme during washing is usually large; accordingly, enzyme stability in-use can be problematic.

Suitable chlorine scavenger anions are widely available, and are illustrated by salts containing ammonium cations or sulfite, bisulfite, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can likewise be used. Other conventional scavengers such as bisulfate, nitrate, chloride, sources of hydrogen peroxide such as sodium perborate tetrahydrate, sodium perborate monohydrate and sodium percarbonate, as well as phosphate, condensed phosphate, acetate, benzoate, citrate, formate, lactate, malate, tartrate, salicylate, etc. and mixtures thereof can be used if desired.

Organic polymeric compound

Organic polymeric compounds are particularly preferred components of the detergent compositions. By organic polymeric compound it is meant essentially any polymeric organic compound commonly used as dispersants, and anti-redeposition and soil suspension agents in detergent compositions.

Organic polymeric compound is typically incorporated in the detergent compositions of the invention at a level of from 0.1% to 30%, preferably from 0.5% to 15%, most preferably from 1% to 10% by weight of the compositions.

Examples of organic polymeric compounds include the water soluble organic homo- or co-polymeric polycarboxylic acids or their salts in which the polycarboxylic acid comprises at least two carboxyl radicals separated from each other by not more than two carbon atoms. Polymers of the latter type are disclosed in GB-A-1,596,756. Examples of such salts are polyacrylates of molecular weight 2000–5000 and their copolymers with any suitable other monomer units including modified acrylic, fumaric, maleic, itaconic, aconitic, mesaconic, citraconic and methylenemalonic acid or their salts, maleic anhydride, acrylamide, alkylene, vinylmethyl ether, styrene and any mixtures thereof. Preferred are the copolymers of acrylic acid and maleic anhydride having a molecular weight of from 20,000 to 100,000.

Preferred commercially available acrylic acid containing polymers having a molecular weight below 15,000 include those sold under the tradename Sokalan PA30, PA20, PA15, PA10 and Sokalan CP10 by BASF GmbH, and those sold under the tradename Acusol 45N by Rohm and Haas.

Preferred acrylic acid containing copolymers include those which contain as monomer units: a) from 90% to 10%, preferably from 80% to 20% by weight acrylic acid or its salts and b) from 10% to 90%, preferably from 20% to 80% by weight of a substituted acrylic monomer or its salts having the general formula—$[CR_2—CR_1(CO—O—R_3)]$— wherein at least one of the substituents $R_1$, $R_2$ or $R_3$, preferably $R_1$ or $R_2$ is a 1 to 4 carbon alkyl or hydroxyalkyl group, $R_1$ or $R_2$ can be a hydrogen and $R_3$ can be a hydrogen or alkali metal salt. Most preferred is a substituted acrylic monomer wherein $R_1$ is methyl, $R_2$ is hydrogen (i.e. a methacrylic acid monomer). The most preferred copolymer of this type has a molecular weight of 3500 and contains 60% to 80% by weight of acrylic acid and 40% to 20% by weight of methacrylic acid.

Other suitable polyacrylate/modified polyacrylate copolymers include those copolymers of unsaturated aliphatic carboxylic acids disclosed in U.S. Pat. Nos. 4,530,766, and 5,084,535 which have a molecular weight of less than 15,000.

Other suitable organic polymeric compounds include the polymers of acrylamide and acrylate having a molecular weight of from 3,000 to 100,000, and the acrylate/fumarate copolymers having a molecular weight of from 2,000 to 80,000.

The polyamino compounds are useful herein including those derived from aspartic acid such as those disclosed in EP-A-305282, EP-A-305283 and EP-A-351629.

Other organic polymeric compounds suitable for incorporation in the detergent compositions herein include cellulose derivatives such as methylcellulose, carboxymethylcellulose and hydroxyethylcellulose.

Further useful organic polymeric compounds are the polyethylene glycols, particularly those of molecular weight 1000–10000, more particularly 2000 to 8000 and most preferably about 4000.

Lime soap dispersant compound

The compositions of the invention may contain a lime soap dispersant compound, which has a lime soap dispersing power (LSDP), as defined hereinafter of no more than 8, preferably no more than 7, most preferably no more than 6. The lime soap dispersant compound is preferably present at a level of from 0.1% to 40% by weight, more preferably 1% to 20% by weight, most preferably from 2% to 10% by weight of the compositions.

A lime soap dispersant is a material that prevents the precipitation of alkali metal, ammonium or amine salts of fatty acids by calcium or magnesium ions. A numerical measure of the effectiveness of a lime soap dispersant is given by the lime soap dispersing power (LSDP) which is determined using the lime soap dispersion test as described in an article by H. C. Borghetty and C. A. Bergman, J. Am. Oil. Chem. Soc., volume 27, pages 88–90, (1950). This lime soap dispersion test method is widely used by practitioners in this art field being referred to, for example, in the following review articles; W. N. Linfield, Surfactant Science Series, Volume 7, p3; W. N. Linfield, Tenside Surf. Det., Volume 27, pages 159–161, (1990); and M. K. Nagarajan, W. F. Masler, Cosmetics and Toiletries, Volume 104, pages 71–73, (1989). The LSDP is the % weight ratio of dispersing agent to sodium oleate required to disperse the lime soap deposits formed by 0.025 g of sodium oleate in 30 ml of water of 333ppm $CaCO_3$ (Ca:Mg=3:2) equivalent hardness.

Surfactants having good lime soap dispersant capability will include certain amine oxides, betaines, sulfobetaines, alkyl ethoxysulfates and ethoxylated alcohols.

Exemplary surfactants having a LSDP of no more than 8 for use in accord with the invention include $C_{16}$–$C_{18}$ dimethyl amine oxide, $C_{12}$–$C_{18}$ alkyl ethoxysulfates with an average degree of ethoxylation of from 1–5, particularly $C_{12}$–$C_{15}$ alkyl ethoxysulfate surfactant with a degree of ethoxylation of about 3 (LSDP=4), and the $C_{13}$–$C_{15}$ ethoxylated alcohols with an average degree of ethoxylation of either 12 (LSDP=6) or 30, sold under the trade names Lutensol A012 and Lutensol A030 respectively, by BASF GmbH.

Polymeric lime soap dispersants suitable for use herein are described in the article by M. K. Nagarajan and W. F. Masler, to be found in Cosmetics and Toiletries, Volume 104, pages 71–73, (1989). Examples of such polymeric lime soap dispersants include certain water-soluble salts of copolymers of acrylic acid, methacrylic acid or mixtures thereof, and an acrylamide or substituted acrylamide, where such polymers typically have a molecular weight of from 5,000 to 20,000.

Suds suppressing system

The detergent compositions, when formulated for use in machine washing compositions, preferably comprise a suds suppressing system present at a level of from 0.01% to 15%, preferably from 0.05% to 10%, most preferably from 0.1% to 5% by weight of the composition.

Suitable suds suppressing systems for use herein may comprise essentially any known antifoam compound, including, for example silicone antifoam compounds, 2-alkyl and alcanol antifoam compounds.

By antifoam compound it is meant herein any compound or mixtures of compounds which act such as to depress the foaming or sudsing produced by a solution of a detergent composition, particularly in the presence of agitation of that solution.

Particularly preferred antifoam compounds for use herein are silicone antifoam compounds defined herein as any antifoam compound including a silicone component. Such silicone antifoam compounds also typically contain a silica component. The term "silicone" as used herein, and in general throughout the industry, encompasses a variety of relatively high molecular weight polymers containing siloxane units and hydrocarbyl group of various types. Preferred silicone antifoam compounds are the siloxanes, particularly the polydimethylsiloxanes having trimethylsilyl end blocking units.

Other suitable antifoam compounds include the monocarboxylic fatty acids and soluble salts thereof. These materials are described in U.S. Pat. No. 2,954,347, issued Sep. 27, 1960 to Wayne St. John. The monocarboxylic fatty acids, and salts thereof, for use as suds suppressor typically have hydrocarbyl chains of 10 to about 24 carbon atoms, preferably 12 to 18 carbon atoms. Suitable salts include the alkali metal salts such as sodium, potassium, and lithium salts, and ammonium and alkanolammonium salts.

Other suitable antifoam compounds include, for example, high molecular weight fatty esters (e.g. fatty acid triglycerides), fatty acid esters of monovalent alcohols, aliphatic $C_{18}$–$C_{40}$ ketones (e.g. stearone) N-alkylated amino triazines such as tri- to hexa-alkylmelamines or di- to tetra alkyldiamine chlortriazines formed as products of cyanuric chloride with two or three moles of a primary or secondary amine containing 1 to 24 carbon atoms, propylene oxide, bis stearic acid amide and monostearyl di-alkali metal (e.g. sodium, potassium, lithium) phosphates and phosphate esters.

Copolymers of ethylene oxide and propylene oxide, particularly the mixed ethoxylated/propoxylated fatty alcohols with an alkyl chain length of from 10 to 16 carbon atoms, a degree of ethoxylation of from 3 to 30 and a degree of propoxylation of from 1 to 10, are also suitable antifoam compounds for use herein.

Suitable 2-alky-alcanols antifoam compounds for use herein have been described in DE 40 21 265. The 2-alkyl-alcanols suitable for use herein consist of a $C_6$ to $C_{16}$ alkyl chain carrying a terminal hydroxy group, and said alkyl chain is substituted in the a position by a $C_1$ to $C_{10}$ alkyl chain. Mixtures of 2-alkyl-alcanols can be used in the compositions according to the present invention.

A preferred suds suppressing system comprises (a) antifoam compound, preferably silicone antifoam compound, most preferably a silicone antifoam compound comprising in combination
   (i) polydimethyl siloxane, at a level of from 50% to 99%, preferably 75% to 95% by weight of the silicone antifoam compound; and
   (ii) silica, at a level of from 1% to 50%, preferably 5% to 25% by weight of the silicone/silica antifoam compound;

wherein said silica/silicone antifoam compound is incorporated at a level of from 5% to 50%, preferably 10% to 40% by weight;

(b) a dispersant compound, most preferably comprising a silicone glycol rake copolymer with a polyoxyalkylene content of 72–78% and an ethylene oxide to propylene oxide ratio of from 1:0.9 to 1:1.1, at a level of from 0.5% to 10%, preferably 1% to 10% by weight; a particularly preferred silicone glycol rake copolymer of this type is DCO544, commercially available from DOW Corning under the tradename DCO544;

(c) an inert carrier fluid compound, most preferably comprising a $C_{16}$–$C_{18}$ ethoxylated alcohol with a degree of ethoxylation of from 5 to 50, preferably 8 to 15, at a level of from 5% to 80%, preferably 10% to 70%, by weight;

A preferred particulate suds suppressor system useful herein comprises a mixture of an alkylated siloxane of the type hereinabove disclosed and solid silica.

The solid silica can be a fumed silica, a precipitated silica or a silica made by the gel formation technique. The silica particles suitable have an average particle size of from 0.1 to 50 micrometers, preferably from 1 to 20 micrometers and a surface area of at least $50 m^2/g$. These silica particles can be rendered hydrophobic by treating them with dialkylsilyl groups and/or trialkylsilyl groups either bonded directly onto the silica or by means of a silicone resin. It is preferred to employ a silica the particles of which have been rendered hydrophobic with dimethyl and/or trimethyl silyl groups. A preferred particulate antifoam compound for inclusion in the detergent compositions in accordance with the invention suitably contain an mount of silica such that the weight ratio of silica to silicone lies in the range from 1:100 to 3:10, preferably from 1:50 to 1:7.

Another suitable particulate suds suppressing system is represented by a hydrophobic silanated (most preferably trimethyl-silanated) silica having a particle size in the range from 10 nanometers to 20 nanometers and a specific surface area above 50 $m^2/g$, intimately admixed with dimethyl silicone fluid having a molecular weight in the range from about 500 to about 200,000 at a weight ratio of silicone to silanated silica of from about 1:1 to about 1:2.

A highly preferred particulate suds suppressing system is described in EP-A-0210731 and comprises a silicone antifoam compound and an organic carrier material having a melting point in the range 50° C. to 85° C., wherein the organic carrier material comprises a monoester of glycerol and a fatty acid having a carbon chain containing from 12 to 20 carbon atoms. EP-A-0210721 discloses other preferred particulate suds suppressing systems wherein the organic carrier material is a fatty acid or alcohol having a carbon chain containing from 12 to 20 carbon atoms, or a mixture thereof, with a melting point of from 45° C. to 80° C.

Other highly preferred particulate suds suppressing systems are described in copending European Application 91870007.1 in the name of the Procter and Gamble Company which systems comprise silicone antifoam compound, a carrier material, an organic coating material and glycerol at a weight ratio of glycerol: silicone antifoam compound of 1:2 to 3:1. Copending European Application 91201342.0 also discloses highly preferred particulate suds suppressing systems comprising silicone antifoam compound, a carrier material, an organic coating material and crystalline or amorphous aluminosilicate at a weight ratio of aluminosilicate: silicone antifoam compound of 1:3 to 3:1. The preferred carrier material in both of the above described highly preferred granular suds controlling agents is starch.

An exemplary particulate suds suppressing system for use herein is a particulate agglomerate component, made by an agglomeration process, comprising in combination (i) from 5% to 30%, preferably from 8% to 15% by weight of the component of silicone antifoam compound, preferably comprising in combination polydimethyl siloxane and silica;

(ii) from 50% to 90%, preferably from 60% to 80% by weight of the component, of carrier material, preferably starch;

(iii) from 5% to 30%, preferably from 10% to 20% by weight of the component of agglomerate binder compound, where herein such compound can be any compound, or mixtures thereof typically employed as binders for agglomerates, most preferably said agglomerate binder compound comprises a $C_{16}$–$C_{18}$ ethoxylated alcohol with a degree of ethoxylation of from 50 to 100; and (iv) from 2% to 15%, preferably from 3% to 10%, by weight of $C_{12}$–$C_{22}$ hydrogenated fatty acid.

Form of the compositions

The detergent compositions of the invention can be formulated in any desirable form such as powders, granulates, pastes, liquids, tablets and gels.

Liquid compositions

The detergent compositions may be formulated as liquid detergent compositions. Such liquid detergent compositions typically comprise from 94% to 35% by weight, preferably from 90% to 40% by weight, most preferably from 80% to 50% by weight of a liquid carrier, e.g., water, preferably a mixture of water and organic solvent.

Gel compositions

The detergent compositions may also be in the form of gels. Such compositions are typically formulated with polyalkenyl polyether having a molecular weight of from about 750,000 to about 4,000,000.

Solid compositions

The detergent compositions are preferably in the form of solids, such as powders and granules.

The particle size of the components of granular compositions in accordance with the invention should preferably be such that no more that 5% of particles are greater than 1.4 mm in diameter and not more than 5% of particles are less than 0. 15 mm in diameter.

The bulk density of granular detergent compositions in accordance with the present invention typically have a bulk density of at least 450 g/liter, more usually at least 600 g/liter and more preferably from 650 g/liter to 1200 g/liter.

Bulk density is measured by means of a simple funnel and cup device consisting of a conical funnel moulded rigidly on a base and provided with a flap valve at its lower extremity to allow the contents of the funnel to be emptied into an axially aligned cylindrial cup disposed below the funnel. The funnel is 130 mm and 40 mm at its respective upper and lower extremities. It is mounted so that the lower extremity is 140 mm above the upper surface of the base. The cup has an overall height of 90 mm, an internal height of 87 mm and an internal diameter of 84 mm. Its nominal volume is 500 ml.

To carry out a measurement, the funnel is filled with powder by hand pouring, the flap valve is opened and powder allowed to overfill the cup. The filled cup is removed from the frame and excess powder removed from the cup by passing a straight edged implement e.g. a knife, across its upper edge. The filled cup is then weighed and the value obtained for the weight of powder doubled to provide the bulk density in g/liter. Replicate measurements are made as required.

Making processes—granular compositions

In general, granular detergent compositions can be made via a variety of methods including dry mixing, spray drying, agglomeration and granulation.

A preferred making process for the compositions herein comprises pre-mixing of the organic silver coating agent with a dispersing agent and the resultive intimate pre-mix being sprayed onto the remainder of the composition. The dispersing agent can advantageously consist of a nonionic surfactant such as described hereinabove, which therefore serves two functions in the present composition.

A preferred dispersing agent is Plurafac LF404 sold by BASF.

An alternate route consists in spraying the intimate mixture of organic silver coating agent and dispersing agent onto the particles of bleaching agent, resulting in a reduction in the rate of dissolution in water of said bleaching agent and therefore providing a control over the rate of release of available oxygen. The coated particles of bleaching agent are then dry-mixed with the remainder of the composition.

In another process embodiment herein, the particle of bleaching agents are compacted before being dry-mixed with the remainder of the composition. This technique slows down the dissolution rate in water, and is therefore advantageously applied to otherwise fast dissolving species like perborate monohydrate.

In this embodiment, the organic silver coating agent is typically compacted along with the bleaching species, and optionally other ingredients like sodium sulphate and/or binders. The resulting particles are then dry-mixed with the remainder of the ingredients.

Washing methods

The compositions of the invention may be used in essentially any washing or cleaning method, including machine dishwashing methods.

Machine dishwashing method

A preferred machine dishwashing method comprises treating soiled articles selected from crockery, glassware, hollowware and cutlery and mixtures thereof, with an aqueous liquid having dissolved or dispensed therein an effective amount of a machine dishwashing composition in accord with the invention. By an effective amount of the machine dishwashing composition it is meant from 8 g to 60 g of product dissolved or dispersed in a wash solution of volume from 3 to 10 liters, as are typical product dosages and wash solution volumes commonly employed in conventional machine dishwashing methods.

In the detergent compositions, the abbreviated component identifications have the following meanings:

| | |
|---|---|
| XYEZS: | $C_{1X}$–$C_{1Y}$ sodium alkyl sulfate condensed with an average of Z moles of ethylene oxide per mole |
| Nonionic: | $C_{13}$–$C_{15}$ mixed ethoxylated/propoxylated fatty alcohol with an average degree of ethoxylation of 3.8 and an average degree of propoxylation of 4.5 sold under the tradename Plurafac LF404 by BASF Gmbh |
| Silicate: | Amorphous Sodium Silcate ($SiO_2$:$Na_2O$ ratio = 2.0) |
| Carbonate: | Anhydrous sodium carbonate |
| Phosphate: | Sodium tripolyphosphate |
| MA/AA: | Copolymer of 1:4 maleic/acrylic acid, average molecular weight about 80,000 |
| Polyacrylate: | Polyacrylate homopolymer with an average molecular weight of 8,000 sold under the tradename PA30 by BASF GmbH |
| Citrate: | Tri-sodium citrate dihydrate<br>Anhydrous sodium perborate tetrahydrate |
| Percarbonate: | Anhydrous sodium percarbonate bleach of empirical formula $2Na_2CO_3.3H_2O_2$ coated with a mixed salt of formula $Na_2SO_4$ .n.$Na_2CO_3$ where n is 0.29 and where the weight ratio of percarbonate to mixed salt is 39:1 |
| TAED: | Tetraacetyl ethylene diamine |
| Paraffin: | Paraffin oil sold under the tradename Winog 70 by Wintershall. |
| Protease: | Proteolytic enzyme sold under the tradename Savinase by Novo Industries A/S (approx 2% enzyme activity). |

-continued

| | |
|---|---|
| Amylase: | Amylolytic enzyme sold under the tradename Termamyl 60T by Novo Industries A/S (approx 0.9% enzyme activity) |
| Lipase: | Lipolytic enzyme sold under the tradename Lipolase by Novo Industries A/S (approx 2% enzyme activity) |
| DETPMP: | Diethylene triamine penta (methylene phosphonic acid), marketed by Monsanto under the Trade name Dequest 2060 |
| Granular Suds Suppressor: | 12% Silicone/silica, 18% stearyl alcohol, 70% starch in granular form |
| Sulphate: | Anhydrous sodium sulphate. |

In the following examples all levels of enzyme quoted are expressed as % active enzyme by weight of the composition.

EXAMPLE 1

The following base machine dishwashing detergent compositions A to F were prepared (parts by weight).

| | A | B | C | D | E | F |
|---|---|---|---|---|---|---|
| Citrate | 15.0 | 15.0 | — | 24.0 | 24.0 | 37.3 |
| Phosphate | — | — | 46.0 | — | — | — |
| MA/AA | 6.0 | 6.0 | — | 6.0 | 6.0 | — |
| Silicate | 9.0 | 9.0 | 33.0 | 27.5 | 27.5 | 25.7 |
| Carbonate | 20.0 | 20.0 | — | 12.5 | 12.5 | — |
| Percarbdnate | 9.1 | 9.1 | 10.4 | 10.4 | 10.4 | — |
| PB4 | — | — | — | — | — | 8.0 |
| TAED | 4.4 | 4.4 | 3.0 | 3.0 | 3.0 | 4.1 |
| Benzotriazole | 0.4 | 0.4 | 0.6 | — | 0.5 | — |
| Paraffin | 0.5 | — | — | — | | — |
| Protease | 0.04 | 0.03 | 0.03 | 0.04 | 0.04 | 0.04 |
| Amylase | 0.02 | 0.01 | 0.01 | 0.02 | 0.01 | 0.01 |
| Lipase | 0.03 | — | 0.03 | 0.03 | 0.03 | — |
| DETPMP | — | — | — | — | — | — |
| Nonionic | 1.7 | 1.7 | 1.5 | 1.5 | 1.5 | 1.5 |
| Sulphate | 1.4 | 2.4 | 2.4 | 12.1 | 12.1 | 3.6 |
| 35AE3S | — | — | 5.0 | — | 5.0 | — |
| Granular Suds Suppressor | — | — | 1.0 | — | 1.0 | — |
| misc/moisture to balance | | | | | | |

To each of the base compositions A–F were added individually the following organic silver coating agents, in the amounts as specified, to give compositions in accord with the invention.

| Organic silver coating agent | Level of incorporation (%) |
|---|---|
| Castor oil | 5 |
| Olive oil | 5 |
| Stearyl stearamide | 1 |
| Peanut oil | 5 |
| Vegetable oil | 5 |
| Grapeseed oil | 5 |
| Corn oil | 5 |
| Ditallow methylammonium chloride | 2.5 |
| Ditallow methylammonium oxide | 5 |

Comparative testing 1

The following comparative testing was conducted; base composition F of Example I was compared for anti-silver tarnishing performance, to the same composition additionally containing individual organic silver coating agents.

The testing involved making silver spoons in a 0.4% solution of each of the test compositions at 65° C. for one hour.

Performance was graded by 4 expert panellists through visual inspection according to the following scale:

where

0=no tarnish (shiny silver)
1=very slight tarnish
2=tarnish
3=very tarnished
4=severe tarnish (black coverage)

Results were as follows: (average of the 4 gradings from the panellists)

| Composition | Grade |
| --- | --- |
| Composition F | 4.0 |
| Composition F + 5% castor oil | 1.0 |
| Composition F + 5% peanut oil | 2.0 |
| Composition F + 5% vegetable oil | 2.0 |
| Composition F + 5% corn oil | 2.0 |
| Composition F + 2.5% diatallowmethylammonium chloride | 3.0 |

What is claimed is:

1. A bleaching composition having enhanced anti-silver tarnishing properties comprising (a) an oxygen-releasing bleaching agent as a source of available oxygen, wherein the oxygen-releasing bleaching agent is provided with a controlled release coating which controls the rate of release of available oxygen from the said composition in a wash solution such that the available oxygen is completely released from composition in a time interval of from 3.5 minutes to 10.0 minutes; and (b) a non paraffin oil fatty acid ester silver coating agent selected from the group consisting of fatty acid triglycerides, diglycerides, monoglycerides, their wholly or partially hydrogenated derivatives, and mixtures thereof; wherein the concentration range of the silver coating agent is such that when the said composition is used to wash silverware the said silver coating agent forms a protective coating on the silverware, thereby inhibiting silver tarnishing effects of the oxygen bleach.

2. A bleaching composition according to claim 1, wherein the rate of release of available oxygen from the composition is such that the available oxygen is completely released from the composition in a time interval of from 5.0 minutes to 8.5 minutes.

3. A bleaching composition according to claim 1, wherein the total level of available oxygen provided by the oxygen-releasing bleaching agent is from 0.3% to 1.7%.

4. A bleaching composition according to claim 1, wherein the silver coating agent is selected from the group consisting of soybean oil, cottonseed oil, castor oil, olive oil, peanut oil, safflower oil, sunflower oil, rapeseed oil, grapeseed oil, palm oil, and mixtures thereof.

5. A bleaching composition according to claim 1, wherein the silver coating agent is selected from the group consisting of glycerol monostearate, glycerol mono-oleate, glycerol monopalmitate, glycerol monobehenate and glycerol distearate.

6. A bleaching composition according to claim 1, wherein the oxygen-releasing bleaching agent controlled release coating is formed of the silver coating agent.

7. A machine dishwashing composition comprising a bleaching composition according to claim 1 and at least one surfactant.

8. A bleaching composition according to claim 1, wherein the weight ratio of the controlled release coating to the bleaching agent is in the range of from 1:99 to 1:2.

9. A bleaching composition according to claim 1, wherein the controlled release coating comprises a material selected from the group consisting of alkali metal and alkali earth metal sulphates, silicates and carbonates.

10. A bleaching composition according to claim 1, wherein the weight ratio of the controlled release coating to the bleaching agent is in the range of from 1:49 to 1:9.

11. A bleaching composition according to claim 10, wherein the controlled release coating comprises sodium silicate of $SiO_2$:$Na_2O$ ratio of from 1.6:1 to 3.4:1.

12. A bleaching composition according to claim 1, containing a bleach catalyst selected from the group consisting of $Mn^{IV}_2(U-O)_3$(1,4,7-trimethyl-1,4,7-triazacyclononane)$_2$-$(PF_6)_2$, $Mn^{III}_2(u-O)_1(u-OAc)_2$(1,4,7-trimethyl-1,4,7-triazacyclononane)$_2$-$(ClO_4)_2$, $Mn^{IV}_4(u-O)_6$(1,4,7-triazacyclononane)$_4$-$(ClO_4)_2$, $Mn^{III}Mn^{IV}_4(u-O)_1(u-OAc)_2$ (1,4,7-trimethyl-1,4,7-triazacyclononane)$_2$-$(ClO_4)_3$, Mn(1,4,7-trimethyl-1,4,7-triazacyclononane$(OCH_3)_3$-$(PF_6)$, Co(2,2'-bispyridyl-amine)$Cl_2$, di-(isothiocyanato) bispyridylamine-cobalt(II), trisdipyridylamine-cobalt(II) per-chlorate, Co(2,2-bispyridylamine)$_2$-$O_2ClO_4$, bis-(2,2'-bispyridylamine) copper(II) perchlorate, tris(di-2-pyridylamine) iron (II) perchlorate, Mn gluconate, $Mn(CF_3SO_3)_2$, $Co(NH_3)_5Cl$, binuclear Mn complexed with tetra-N-dentate and bi-N-dentate ligands, and mixtures thereof.

13. A bleaching composition according to claim 12, wherein the bleach catalyst is selected from the group consisting of $N_4Mn^{III}$ $(u-O)_2Mn^{IV}N_4)^+$, $(bipy_2Mn^{III}(u-O)$ $_2Mn^{IV}bipy_2)$-$(ClO_4)_3$, and mixtures thereof.

14. A bleaching composition according to claim 1, wherein the oxygen-releasing beaching agent comprises in combination an inorganic perhydrate salt and a peroxyacid precursor compound, and further wherein the inorganic perhydrate salt is provided with said controlled release coating.

15. A bleaching composition according to claim 14, comprising 2–30 weight percent of the coated inorganic perhydrate salt, 1–15 weight percent of the peroxyacid bleach precursor compound, and 0.1–5 weight percent of the silver coating agent.

16. A bleaching composition according to claim 14, comprising 5–25 weight percent of the coated inorganic perhydrate salt, 1.5–10 weight percent of the peroxyacid bleach precursor compound, and 0.1–5 weight percent of the silver coating agent.

17. A bleaching composition according to claim 14, comprising 1–40 weight percent of the coated inorganic perhydrate salt, 0.5–20 weight percent of the peroxyacid bleach precursor compound, and 0.05–10 weight percent of the silver coating agent.

18. A bleaching composition according to claim 17, further comprising 0.05–10 weight percent of an additional corrosion inhibitor compound.

19. A bleaching composition having enhanced anti-silver tarnishing properties comprising (a) an oxygen-releasing bleaching agent as a source of available oxygen, wherein the oxygen-releasing bleaching agent is provided with a controlled release coating which controls the rate of release of available oxygen from the said composition in a wash solution such that the available oxygen is completely released from composition in a time interval of from 3.5 minutes to 10.0 minutes; and (b) a non-paraffin oil organic silver coating agent comprising a fatty ester of a $C_1$–$C_{40}$ alcohol; wherein the concentration range of the silver coating agent is such that when the said composition is used to wash silverware the said silver coating agent forms a protective coating on the silverware, thereby inhibiting silver tarnishing effects of the oxygen bleach.

20. A machine dishwashing composition comprising a bleaching composition according to claim 19 and at least one surfactant.

21. A bleaching composition according to claim 19, wherein the weight ratio of the controlled release coating to the bleaching agent is in the range of from 1:49 to 1:9.

22. A bleaching composition according to claim 19, wherein the weight ratio of the controlled release coating to the bleaching agent is in the range of from 1:99 to 1:2.

23. A bleaching composition according to claim 19, wherein the controlled release coating comprises a material selected from the group consisting of alkali metal and alkali earth metal sulphates, silicates and carbonates.

24. A bleaching composition according to claim 19, wherein the oxygen-releasing bleaching agent comprises in combination an inorganic perhydrate salt and a peroxyacid precursor compound, and further wherein the inorganic perhydrate salt is provided with said controlled release coating.

25. A bleaching composition according to claim 24, comprising 1–40 weight percent of the coated inorganic perhydrate salt, 0.5–20 weight percent of the peroxyacid bleach precursor compound, and 0.05–10 weight percent of the silver coating agent.

* * * * *